United States Patent
O'Hanley et al.

(10) Patent No.: US 11,939,935 B2
(45) Date of Patent: *Mar. 26, 2024

(54) MULTI-PART FLUID CHAMBER AND METHOD OF MANUFACTURING

(71) Applicant: ABL Space Systems, El Segundo, CA (US)

(72) Inventors: Harrison O'Hanley, Los Angeles, CA (US); Ryan Kuhn, Brentwood, CA (US); Jessica Pauley, Manhattan Beach, CA (US); Oleg Teplyuk, Westchester, CA (US)

(73) Assignee: ABL Space Systems, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,883

(22) Filed: Sep. 19, 2022

(65) Prior Publication Data

US 2023/0184196 A1 Jun. 15, 2023

Related U.S. Application Data

(63) Continuation of application No. 16/529,733, filed on Aug. 1, 2019, now Pat. No. 11,448,163.

(60) Provisional application No. 62/727,452, filed on Sep. 5, 2018.

(51) Int. Cl.
  *F02K 1/80* (2006.01)
  *F02K 9/64* (2006.01)
  *F02K 9/97* (2006.01)
  *B23K 9/00* (2006.01)

(52) U.S. Cl.
  CPC .............. *F02K 1/80* (2013.01); *F02K 9/64* (2013.01); *F02K 9/972* (2013.01); *B23K 9/0026* (2013.01)

(58) Field of Classification Search
  CPC ... F02K 1/80; F02K 9/64; F02K 9/972; B23K 9/0026
  See application file for complete search history.

(56) References Cited

U.S. PATENT DOCUMENTS 6,107,596 A 8/2000 Semenov et al.
7,234,294 B1 6/2007 Haggander
(Continued)

OTHER PUBLICATIONS

Non-Final Office Action issued in U.S. Appl. No. 16/529,733 dated Nov. 2, 2021.
(Continued)

*Primary Examiner* — Lorne E Meade
(74) *Attorney, Agent, or Firm* — Hogan Lovells US LLP

(57) ABSTRACT

A coupling system is utilized to form a multi-part rocket engine thrust compartment that maintains inner channels within walls of the thrust compartment for regenerative cooling. The coupling system includes an insert joint arranged between joint faces of a first segment and a second segment. The first segment and the second segment include inner edges that, when jointed together, form an inner wall. The joint insert is installed between the first segment and the second segment after the inner wall is formed and coupled to the first segment and the second segment. The joint faces of the first segment and the second segment include extending feature to form a flow passage along with cavities at least partially defined by the joint insert.

17 Claims, 20 Drawing Sheets

(56) References Cited

U.S. PATENT DOCUMENTS 7,299,622 B2 11/2007 Haggander
11,448,163 B1 * 9/2022 O'Hanley ............... F02K 9/972

OTHER PUBLICATIONS

Notice of Allowance issued in U.S. Appl. No. 16/529,733 dated May 17, 2022.

* cited by examiner

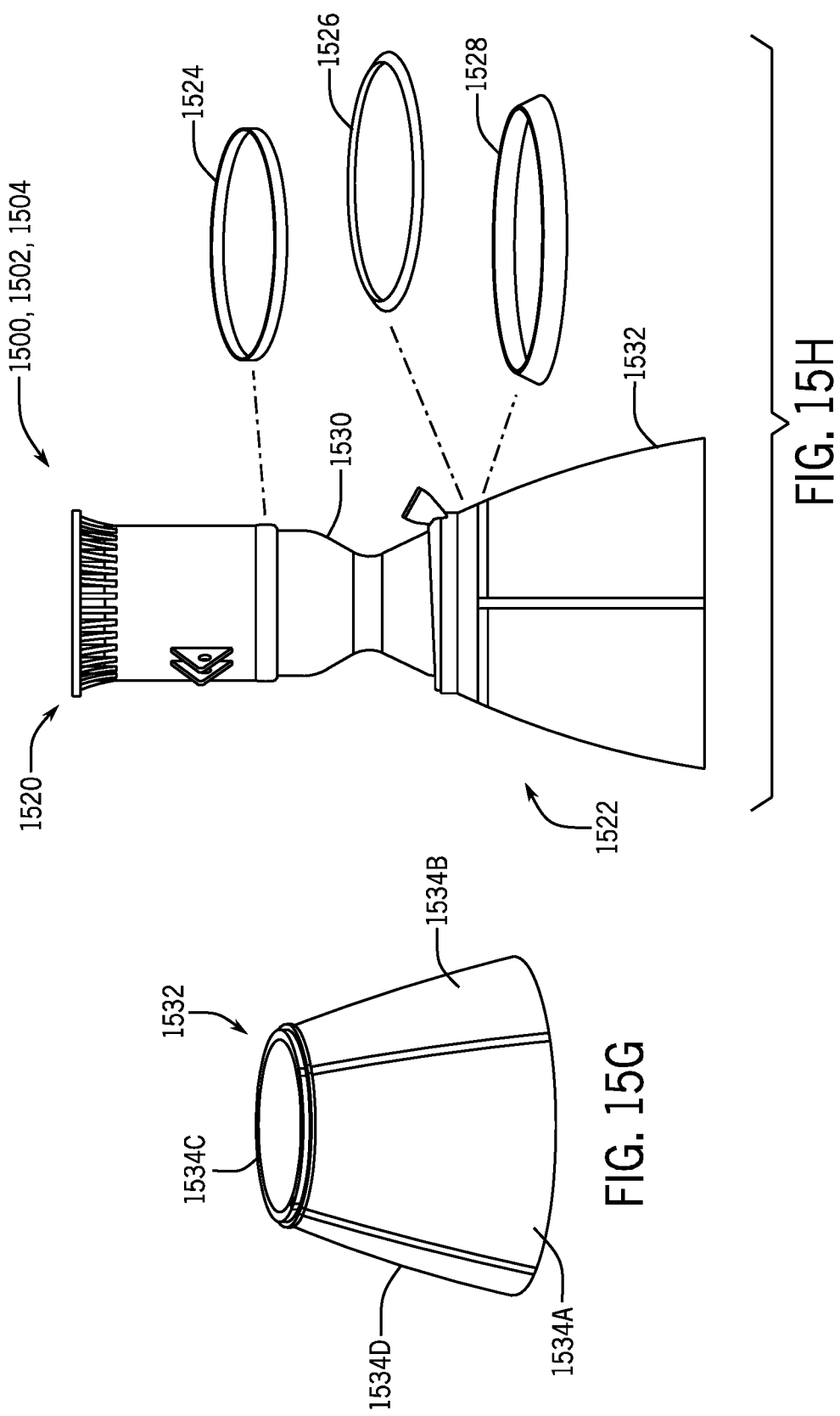

MULTI-PART FLUID CHAMBER AND METHOD OF MANUFACTURING

CROSS-REFERENCE TO RELATED APPLICATIONS

This application is a continuation application of U.S. patent application Ser. No. 16/529,733 entitled "MULTI-PART CHAMBER AND METHOD OF MANUFACTURING," filed Aug. 1, 2019 which claims priority to, and the benefit of, U.S. Provisional Application No. 62/727,452, entitled "MULTI-PART LIQUID PROPELLANT ROCKET ENGINE CHAMBER AND METHOD OF MANUFACTURING", filed Sep. 5, 2018, the full disclosures of which are hereby incorporated herein by reference in their entireties for all purposes.

BACKGROUND

Pressurized fluid chambers, such as thrust chambers, are often formed from machined pieces using conventional manufacturing methods, such as machining or forging various components. The machining and forging processes can be complex and time consuming, for example, due to the various channels formed within the walls of the thrust chambers to enable regenerative cooling. As a result, costs associated with the thrust chambers may be significant, thereby increasing barriers to entry for new operators in the industry. Moreover, alternative methods of manufacturing, such as additive manufacturing, suffer from problems associated with the size of the thrust chambers. These non-conventional methods have proven ineffective for large components. Furthermore, many methods of joining pieces together are unavailable due to the temperatures, pressures, and operation environment for rocket engines.

BRIEF DESCRIPTION OF THE DRAWINGS

Various embodiments in accordance with the present disclosure will be described with reference to the drawings, in which:

FIGS. 15A-15H illustrate isometric view of embodiments of thrust chambers formed using coupling systems, in accordance with embodiments of the present disclosure;

DETAILED DESCRIPTION

Figure 1:
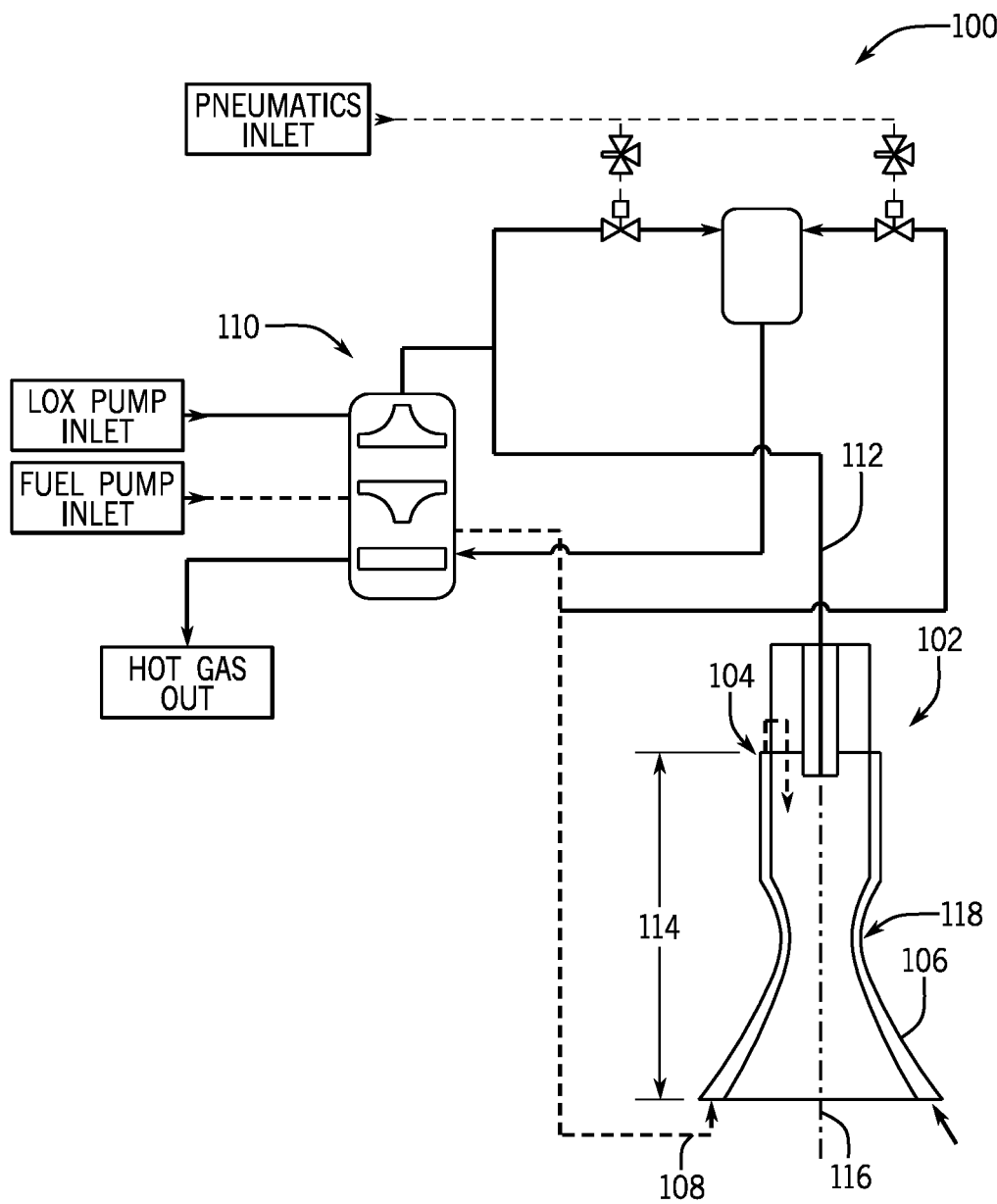
FIG. 1 illustrates a schematic diagram of an embodiment of a propulsion system, in accordance with embodiments of the present disclosure.

Systems and methods in accordance with various embodiments of the present disclosure may overcome one or more of the aforementioned and other deficiencies experienced in conventional approaches for forming thrust chambers utilized in rocket engines.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", "other embodiments", or "various embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Furthermore, when describing certain features that may be duplicative between multiple items, the features may be designated with similar reference numerals followed by a corresponding identifier, such as "A" or "B".

In various embodiments, a multi-part rocket engine thrust compartment, including channels for regenerative cooling, is formed using parts created via an additive manufacturing process, such as three-dimensional printing. As a result, the thrust compartment may include multiple annular segments that are coupled together via a coupling system, which may include one or more inserts arranged between joint faces of the segments. Various embodiments described herein include an assembly process that may reduce costs associated with forming the thrust chamber due to the elimination of complex machining and tooling operations for generating the thrust chambers.

In various embodiments, the segments include the joint faces that form an opening therebetween, enabling installation of the joint insert to couple a first segment to a second segment. In various embodiments, the segments include walls having an inner wall and an outer wall, and as a result, multiple coupling operations, for example welding operations, are utilized to join the segments together. The opening between the joint faces may enable a welding operation along the inner wall to form an inner joint that may be inspected and/or repaired prior to installation of the joint insert. Thereafter, the joint insert may be installed within the opening and the outer wall may be coupled together via a connection process, such as a welding operation.

In various embodiments, the joint faces form one or more cavities to collect debris or the like from the welding operation utilized to form the outer joints. The cavities may be arranged radially inward from the respective outer joints. Accordingly, the cavities may catch debris to block the debris from entering an annular flow passaged formed by the inner wall and the joint insert. Accordingly, in embodiments where the walls include channels to enable regenerative cooling, the annular flow passage enables flow between channels of adjacent segments.

Various embodiments described herein may refer to thrust chambers and rocket engines. However, it should be appreciated that the systems and methods described may be used in a variety of industries and are not limited to use with rocket engines. For example, the systems and methods described herein may be utilized in a variety of industries where tubular or annular components are coupled together, such as oil and gas operations, power generation, and the like. Furthermore, the systems and methods described herein may include a variety of different materials, which may be particularly selected based on operating conditions. For example, in aerospace applications, materials may include metals and metal alloys such as high nickel alloys (e.g., Inconel), aluminum alloys, composite materials, and the like. Additionally, oil and gas and/or power generation may include carbon steels, stainless steels, nickel alloys, and the like. Furthermore, in certain embodiments, the materials may also include coatings, clad liners, and the like.

Various embodiments may refer to manufacturing component utilizing additive manufacturing techniques. However, it should be appreciated that manufacturing a component may refer to one or more pieces of a component. For example, additive manufacturing may be utilized to add features to a forged or traditionally manufactured component.

FIG. 1 is a schematic diagram of an embodiment of a propulsion system 100. In the illustrated embodiment, a thrust chamber 102 includes a regenerative cooling system 104 extending through walls 106 of the thrust chamber 102. As will be described below, the regenerative cooling system 104 comprises various channels within the walls 106 of the thrust chamber 102 to enable a working fluid 108 (e.g., a liquid, a gas, a solid, or a combination thereof) to cool the walls 106 of the thrust chamber 102 while also heating the working fluid 108 prior to injection into the thrust chamber 102. In various embodiments, the working fluid 108 is a fuel from a fuel supply, such as a Rocket Propellant (e.g., RP-1).

RP-1 may refer to a highly refined form of kerosene, as would be known by one skilled in the art. However, it should be appreciated that other types of fuel may also be utilized and that various embodiments are not limited to the use of RP-1.

In the illustrated embodiment, the working fluid 108 is directed toward the thrust chamber 102 via a turbopump assembly 110. The working fluid 108 flows through the regenerative cooling system 104, simultaneously cooling the walls 106 and also being heated before injection into the thrust chamber 102. Upon or near injection, the working fluid 108 is mixed with an oxidizer 112, such as liquid oxygen (LOX). As illustrated, the oxidizer 112 may also be directed toward the thrust chamber 102 via the turbopump assembly 110. As a result, the mixing of the fuel and oxygen facilitates propulsion of the rocket as the hot gases are expelled out of the thrust chamber 102.

As described above, in various embodiments the regenerative cooling system 104 is utilized to cool the walls 106 of the thrust chamber 102. The regenerative cooling system 104 may include channels or passages formed within the walls 106 and extending along a length 114 of the thrust chamber 102. The channels or passages may be substantially longitudinal, relative to an axis 116 of the thrust chamber 102, such that the channels are substantially aligned with the axis 116. However, it should be appreciated that the channels may also bend or conform to the shape of the walls 106, for example, at a reduced diameter portion 118 of the thrust chamber 102. In certain embodiments, the channels may be separated and arranged in a parallel, circumferential arrangement about the thrust chamber. However, in certain embodiments, the channels may be formed in an annular or helically swept arrangement such that the channels extend along the axis 116 and revolve about the axis 116.

Manufacturing of the thrust chamber 102 may be challenging due to the materials forming the thrust chamber 102 (e.g., high temperature alloys, such as Inconel) and also the arrangement of the channels within the thrust chamber 102. Typically, the components may be cast or otherwise machined, which may be expensive and utilize complex tooling and dies in order to form the channels. Moreover, as noted above, non-conventional techniques such as additive manufacturing fail to produce components that are large enough for commercial needs. For example, many additive manufacturing processes may be limited to sizes of approximately 1.5 cubic feet, which is too small for commercial applications. Additionally, obtaining an additive manufacturing machine, or hiring a third party to generate large parts using an additive manufacturing machine, may be prohibitively expensive. Also, warpage and other failures are more common as components made using additive manufacturing processes become larger. As a result, costs may further be added for reworking material that is below a threshold level of acceptability. Furthermore, additive manufacturing processes may not be able to perform certain forms of manufacturing with high accuracy. For example, brazing a component to a machine forging may be difficult and result in errors or damage to the parts. Accordingly, embodiments of the present disclosure are directed toward systems and methods for forming thrust chambers 102 utilizing various subsections that may be joined together, for example via a welding or other coupling technique.

Figure 2:
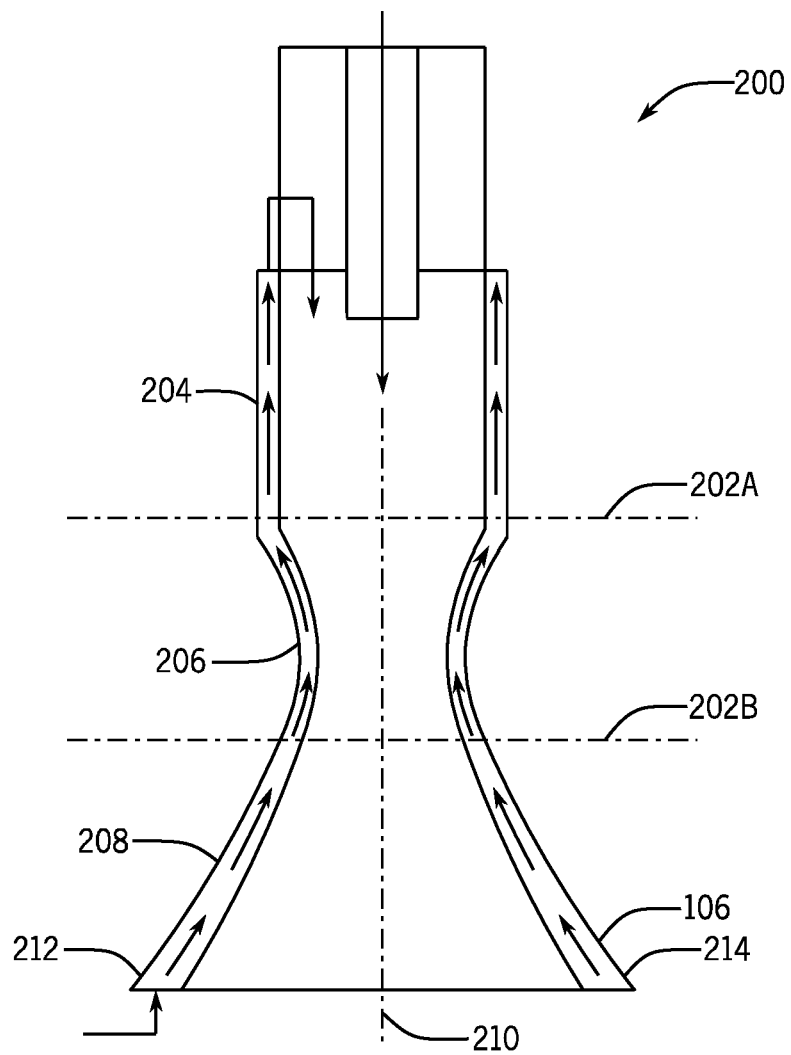
FIG. 2 illustrates a schematic diagram of an embodiment of a thrust chamber, in accordance with embodiments of the present disclosure.

FIG. 2 is a schematic diagram of an embodiment of a thrust chamber 200 including various joint planes 202 for segmenting the thrust chamber 200 into subsections. It should be appreciated that the joint planes 202A, 202B are for illustrative purposes only and that, in various embodiments, the joint planes 202A, 202B may be arranged at different locations. Moreover, there may be more or fewer joint planes 202. In the embodiment illustrated in FIG. 2, the two joint planes 202A, 202B form a first segment 204, a second segment 206, and a third segment 208. However, it should be appreciated that a different number of joint planes 202 will lead to a different number of segments. As will be described below, during assembly the channels that extend through the walls 106 of the thrust chamber 200 are aligned to facilitate flow through the walls 106 to enable regenerative cooling. Accordingly, techniques for joining the segments 204, 206, 208 enable continuous flow through the channels without blocking or otherwise damaging the channels.

The embodiment illustrated in FIG. 2 further includes a longitudinal joint plane 210 that forms a first longitudinal segment 212 and a second longitudinal segment 214. However it should be appreciated that a different number of longitudinal joint planes 210 may lead to a different number of longitudinal segments 212, 214. In various embodiments, the thrust chamber 200 may be manufactured in a petal configuration utilizing both longitudinal segments (e.g., having vertical seams) and radial segments (e.g., having circumferential seams).

Figure 3:
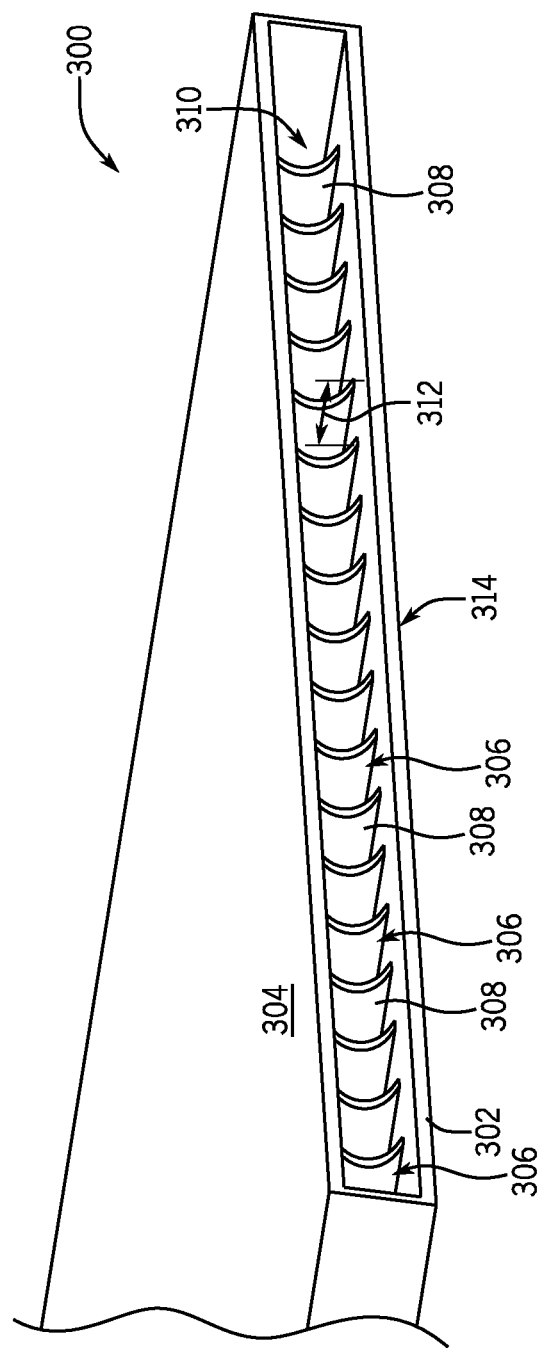
FIG. 3 illustrates a perspective view of an embodiment of a wall, in accordance with embodiments of the present disclosure.
Figure 4:
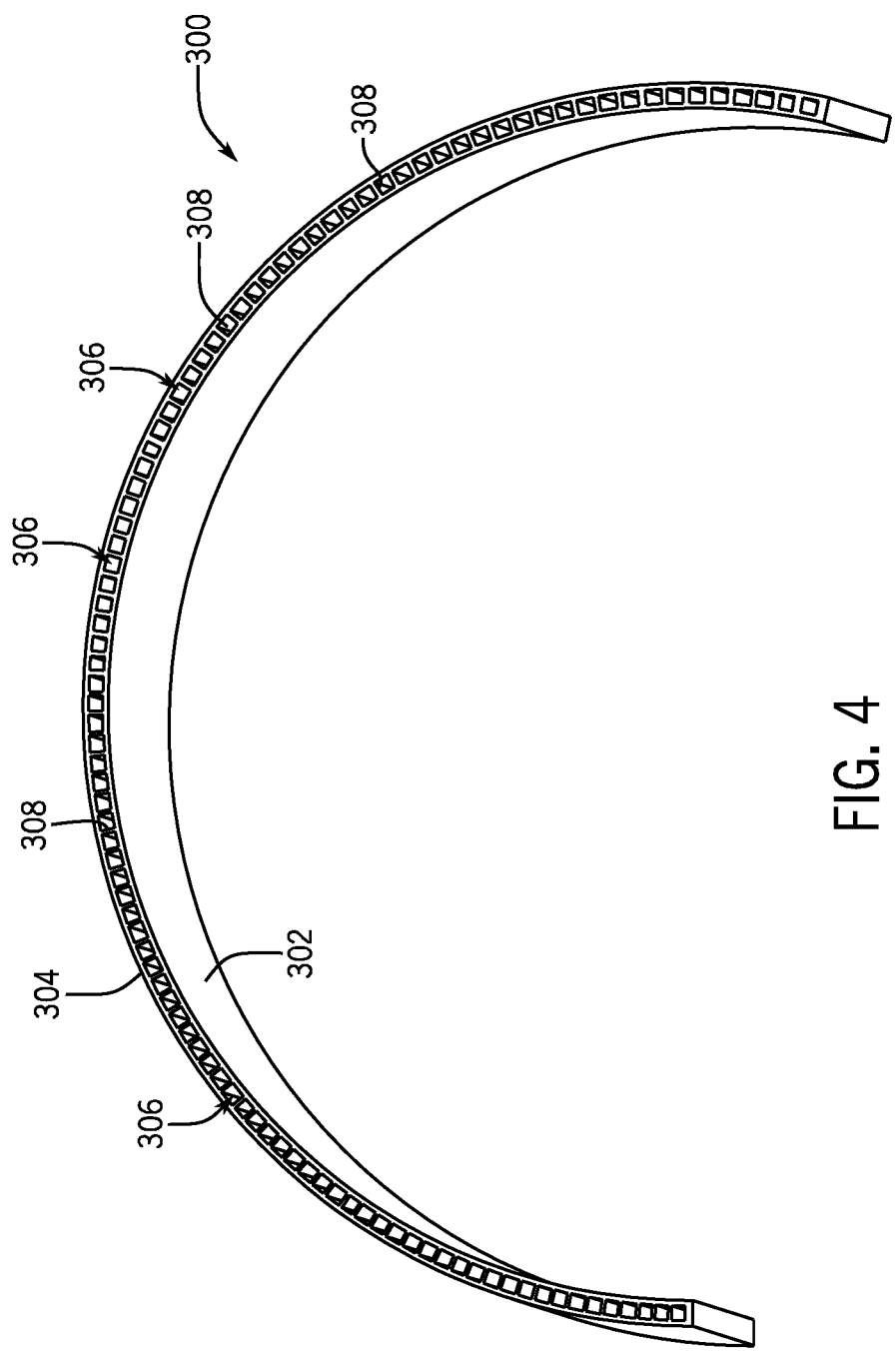
FIG. 4 illustrates a perspective view of an embodiment of a wall, in accordance with embodiments of the present disclosure.

FIGS. 3 and 4 are perspective views of embodiments of a portion of a thrust chamber 300 including an inner wall 302 and an outer wall 304. It should be appreciated that the illustrated portion in FIG. 3 is arranged as a flat plate for illustrative purposes and that, in various embodiments, the portion may be curved, such as in FIG. 4. In various embodiments, channels 306 are formed between the inner wall 302 and the outer wall 304 via dividers 308 that extend between the inner wall 302 and the outer wall 304. In the illustrated embodiment, the dividers 308 include respective curved ends 310. As will be appreciated, the curve ends 310 enable portions of the dividers 308 to be arranged at a distance 312 away from a joint edge 314, where heat may be located during a joining operation, such as welding. Moreover, the arrangement of the dividers 308 may facilitate flow between different flow channels, as will be described below. In various embodiments, the inner wall 302 and the outer wall 304 may be coupled to a mating portion of the thrust chamber, for example via welds arranged along the inner wall 302 and the outer wall 304. As a result, segments may be joined together while still enabling passage of the working fluid through the channels 306.

Figure 5:
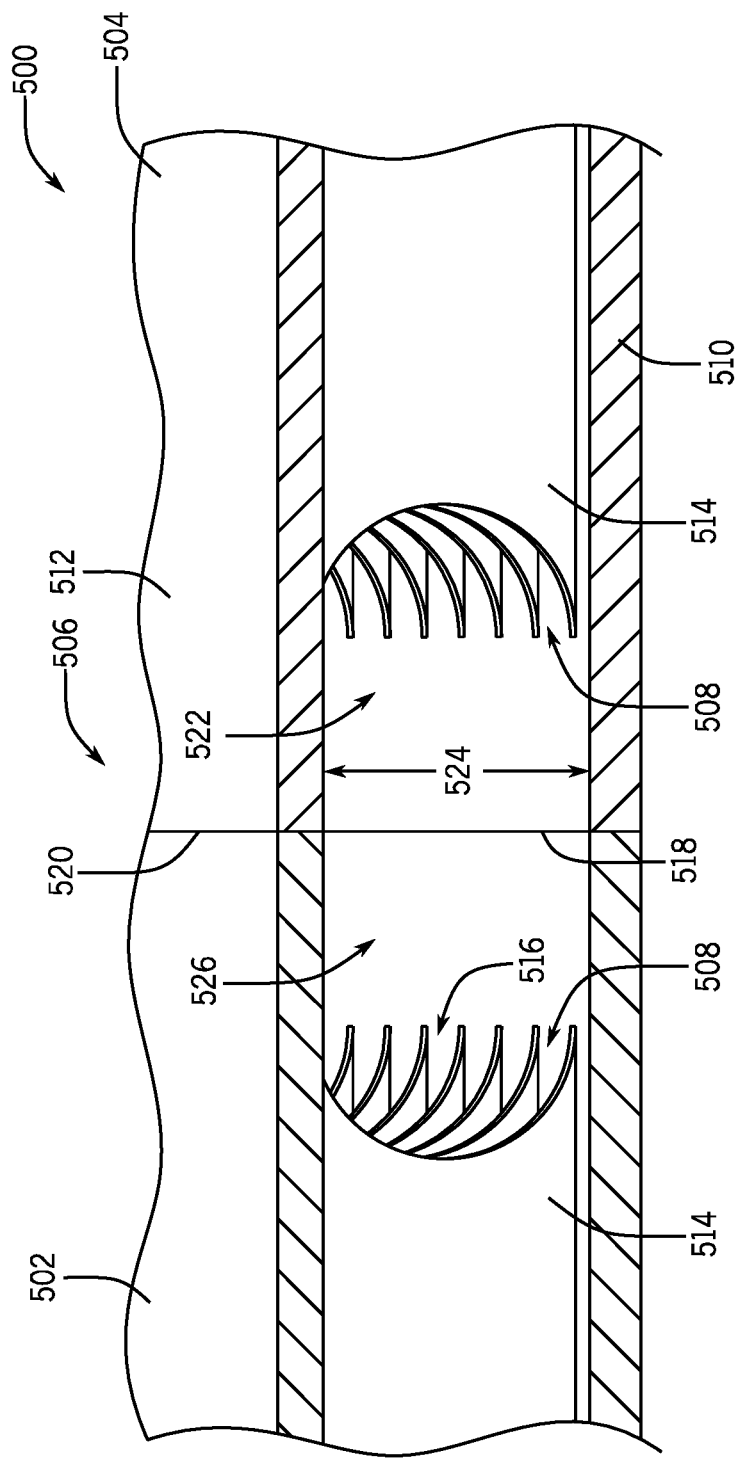
FIG. 5 illustrates a perspective view of an embodiment of a wall including a flow passage, in accordance with embodiments of the present disclosure.

FIG. 5 is a cross-sectional perspective view of an embodiment of a thrust chamber 500 including a first segment 502 coupled to a second segment 504 at a joint 506. In various embodiments, flow channels 508 are arranged between the inner wall 510 and the outer wall 512, and may extend circumferentially about the thrust chamber 500. It should be appreciated that a width of the flow channels 508 may not be equal, and that various channels may have different widths. Moreover, the illustrated dividers 514 forming the flow channels 508 may not be equally spaced or shaped the same. For example, various dividers 514 may be thicker or thinner. Moreover, various dividers 514 may not include the curved ends 516.

The joint 506 between the first segment 502 and the second segment 506 is illustrated as including an inner joint 518 at the inner walls 510 and an outer joint 520 at the outer walls 510. Moreover, an annular flow area 522 is arranged along the joint 506 to facilitate flow of the working fluid through the channels 508. In certain embodiments, an inner weld along the inner weld joint 518 may be challenging to form, as the outer wall 512 may block access to the inner joint 518. Moreover, a thickness 524 may be too small to provide access to the inner joint 518 via an alternative route (e.g., perpendicular to the dividers 514). Additionally, cleaning or inspecting the weld afterward (e.g., removing debris, smoothing the cap, performing penetration testing, x-raying, etc.) may also be difficult to achieve in the small area. Debris or other damage along the interior may block or reduce flow through the channels 508, which may reduce cooling along the thrust chamber 500. Accordingly, embodiments of the present disclosure may include a joint insert that extends circumferentially about the thrust chamber 500 at the joint 506. The joint insert may be arranged along the outer joint 520 to facilitate the connection between the first segment 502 and the second segment 504, while reducing the likelihood of damage to interior portions of the wall, which may reduce flow or otherwise reduce the effectiveness of the regenerative cooling.

In various embodiments, an annular flow passage 526 is formed at the joint 506 to facilitate flow of the working fluid between the flow channels 508 of the adjacent segments 502, 504. In various embodiments, the annular flow passage 526 may facilitate mixing of the working fluid, which may provide improved heat transfer capabilities. For example, mixing devices, such as turbulent flow paths or the like, may be included. The annular flow passage 526 may enable fluid flow in a direction substantially parallel to the dividers 514 and in a direction substantially perpendicular to the dividers 514 (e.g., to cross between different channels 508). Accordingly, regenerative cooling capabilities are maintained, even with multi-segment construction of the thrust chamber 500.

Figure 6:
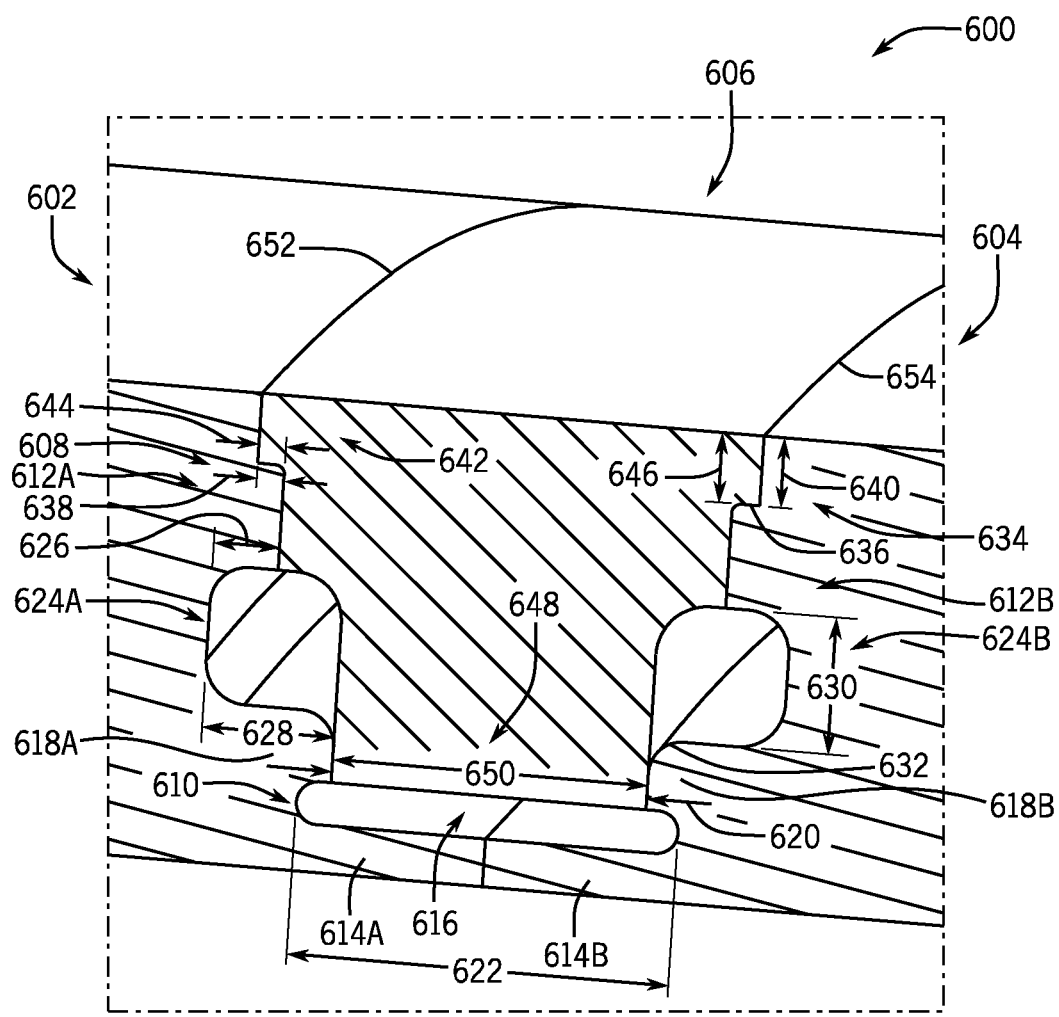
FIG. 6 illustrates a cross-sectional perspective view of an embodiment of a coupling system, in accordance with embodiments of the present disclosure.

FIG. 6 is a cross-sectional perspective view of an embodiment of a coupling system 600 to join a first segment 602 to a second segment 604. The illustrated coupling system 600 includes a joint insert 606 (e.g., weld ring) that is arranged within an opening 608 (e.g., cavity) formed between the first segment 602 and the second segment 604. In various embodiments, the opening 608 is an annular opening, for example, where the segments 602, 604 are annular components. The joint insert 606 couples the first segment 602 to the second segment 604 while maintaining an annular flow passage 610 to enable the working fluid to flow within the channels (not pictured). The working flow may flow substantially perpendicular to the annular flow passage 610 and/or parallel to the annular flow passage 610, as described with respect to FIG. 5. It should be appreciated that various dimensions described herein, may be particularly selected based on various factors such as operation conditions, design parameters, tooling constraints, and the like, and accordingly are not intended to limit the disclosure.

In various embodiments, each segment 602, 604 includes a joint face 612A, 612B (which may individually be referred to as 612 for clarity when discussing features common to both joint faces 612A, 612B) having a profile including one or more features to facilitate coupling between the segment 602, 604. A respective inner edge 614A, 614B (which may individually be referred to as 614 for clarity when discussing features common to both inner edges 614A, 614B) extends outwardly from the respective joint faces 612A, 612B (e.g., longitudinally, relative to a flow of the working fluid). The respective inner edges 614A, 614B mate to form an inner joint 616 (e.g., to form the inner wall described above). It should be appreciated that "inner" in this instance refers to a radially inward joint relative to an outer circumference of the thrust chamber. The illustrated inner joint 616 is formed by square inner edges 614A, 614B. However, it should be appreciated that in other embodiments the inner edges 614A, 614B may be single-bevel, double-bevel, single-J, double-J, single-V, double-V, single-U, double-U, or any other reasonable shape. Moreover, the inner edges 614A, 614B may not be the same shape. For example, the inner edge 614A may have a single-bevel while the inner edge 614B may be square. In operation, the inner joint 616 may couple the first segment 602 to the second segment 604 via a weld, which may be a full-penetration weld. Various welding processes may be used, such as electron beam welding, tungsten inert gas welding, metal inert gas welding, arc welding, shielded metal arc welding, flux-cored arc welding, metal inert gas welding and the like. Furthermore, other coupling operations may be utilized, such as adhesives, fasteners, and the like. Advantageously, the joint may be cleaned up after the welding process (e.g., remove debris, grind the weld cap, etc.) and may also be inspected prior to installation of the joint insert 606 due to the access provided by the opening 608.

Moving radially outward from the inner joint 616, respective lips 618A, 618B (which may individually be referred to as 618 for clarity when discussing features common to both lips 618A, 618B) are formed on the respective joint faces 612A, 612B. As illustrated, the lips 618A, 618B do not extend as longitudinally far as the inner edges 614A, 614B. The illustrated lips 618A, 618B, in part with the inner edges 614A, 614B, form at least a portion of the annular flow passage 610 to facilitate passage of the working fluid between the segments 602, 604 (e.g., between the non-illustrated channels of the segments 602, 604). As illustrated, a length 620 between the lip 618A, 618B is less than a length 622 of the annular flow passage 610. Accordingly, as will be described below, the flow passage 610 is also partially formed by the joint insert 606.

In various embodiments, a cavity 624A, 624B (which may individually be referred to as 624 for clarity when discussing features common to both cavities 624A, 624B) are formed along the respective joint faces 612A, 612B. The cavity 624A is formed at least partially by the lip 618A (as is the cavity 624B with respect to the lip 618B) and also by a stepped profile that will be described below. Each respective cavity 624A, 624B extends longitudinally into the body of the respective segments 602, 604. As a result, a void space is formed to collect debris during welding operations (or other coupling operations) that couple the joint insert 606 to the segments 602, 604. The illustrated cavity 624A has a first length 626, a second length 628, and a height 630 that form at least a portion of the profile of the joint face 612A. The illustrated first length 626 is less than the illustrated second length 628, in the illustrated embodiment, however it should be appreciated that in other embodiments the first length 626 may be greater than or equal to the second length 628. The illustrated second length 628 also includes a rounded edge 632 forming at least a portion of the lip 618. It should be appreciated that the rounded edge 632 is a non-limiting example and that the edge 632 may also be straight, angled, or any other reasonable shape.

As described above, the cavities 624A, 624B are formed to collect debris. In welding operations, the weld metal may flow through one or more gaps that are arranged between the components that are being joined together. As a result, the consumable material utilized in the joining process may extend through the material to form debris or an extension of material on the back side of the weld. This material, if it were to extend into the annular flow passage 610, could potentially block or hinder flow of the working fluid through the channels. This could potentially reduce the cooling effectiveness of the working fluid, which would be undesirable. In welding operations where each side may be inspected, the additional material may be ground or scraped off. However, due to the limited access provided in the embodiments described herein, the cavities 624A, 624B may be utilized to capture the excess material or debris, thereby eliminating steps for cleaning or reshaping the back side of the connection joint.

In the embodiment illustrated in FIG. 6, a stepped profile 634 is arranged radially outward from the cavity 624. The stepped profile includes a shoulder 636 that extends longitudinally inward by a length 638. In the illustrated embodiment, the length 638 of the shoulder 636 is less than the first length 626 of the cavity 624. As will be described, the additional size of the first length 626 may protect various weld joint from potential cracking. The stepped profile includes a height 640 proximate the shoulder 636, the height 640 extends radially inward toward the inner joint 616. The size of the height 640 may be particularly selected to maintain the annular flow passage 610. For example, a deeper height 640 may reduce the cross section of the passage 610 while a shallower height 640 may increase the cross section.

The coupling system 600 further includes the joint insert 606, which is positioned within the opening 608 such that an extension 642 of the joint insert 606 contacts the shoulder 636, thereby blocking further inward radial movement of the joint insert 606. As illustrated, the extension 642 forms at least a portion of the joint insert profile. The extension 642 includes a length 644 that is substantially equal to the length 638 of the shoulder 636. Furthermore, the extension 642 includes a height 646 that is substantially equal to the height 640 of the shoulder 636. Accordingly, the mating relationship between the joint insert 606 and the joint faces 612A, 612B secures the joint insert 606 from extending into the annular flow passage 610.

Further illustrated in FIG. 6 is a lower portion 648 of the joint insert 606 that extends from the stepped profile 634 toward the annular flow passage 610. In the illustrated embodiment, the lower portion 648 includes a length 650 that is substantially equal to the length 620. It should be appreciated that, in the illustrated embodiment, the joint insert 606 is not in a sealing relationship with the lip 618A, 618B. However, in other embodiments, a sealing relationship may be formed. The illustrated lower portion 648 forms at least a portion of the cavity 624, thereby developing an area to receive excess material or debris when the joint insert 606 is coupled to the segments 602, 604, for example, via a welding operation such as electron beam welding. In this manner, the first and second segments 604, 606 may be joined together while maintaining paths for the flow of fluid through the channels.

In various embodiments, the first segment 602 is coupled to the second segment 604 via one or more welding operations and the joint insert 606. For example, the first segment 602 is arranged proximate the second segment 604 such that their respective channels are aligned and the inner edges 614A, 614B are positioned proximate one another. The inner joint 616 may be formed, for example via electron beam welding, and subsequently inspected and/or cleaned (e.g., ground, finished, etc.) Thereafter, the joint insert 606 may be positioned within the opening 608. The extension 642 may contact the shoulder 636, thereby blocking further movement of the joint insert 606 and also providing an indication that the joint insert 606 is positioned within the opening 608. Next, a first joint 652 may be formed at the junction between the joint insert 606 and the first segment 602. Debris that may form during the welding operation may be captured by the cavity 624, and as a result, the "blind" welding operation may be performed without inspecting the reverse end to determine whether weld metal, shavings, or the like have formed. Moreover, the tight fit between the length 650 and the length 620 blocks debris from flowing into the annular flow passage 610. Additionally, a second joint 654 may be formed at the junction between the joint insert 606 and the second segment 604. As a result, the first segment 602 and the second segment 604 may be joined together, while enabling flow along the channels, thereby facilitating construction of the thrust chamber using smaller segments that may be formed using additive manufacturing techniques.

Figure 7:
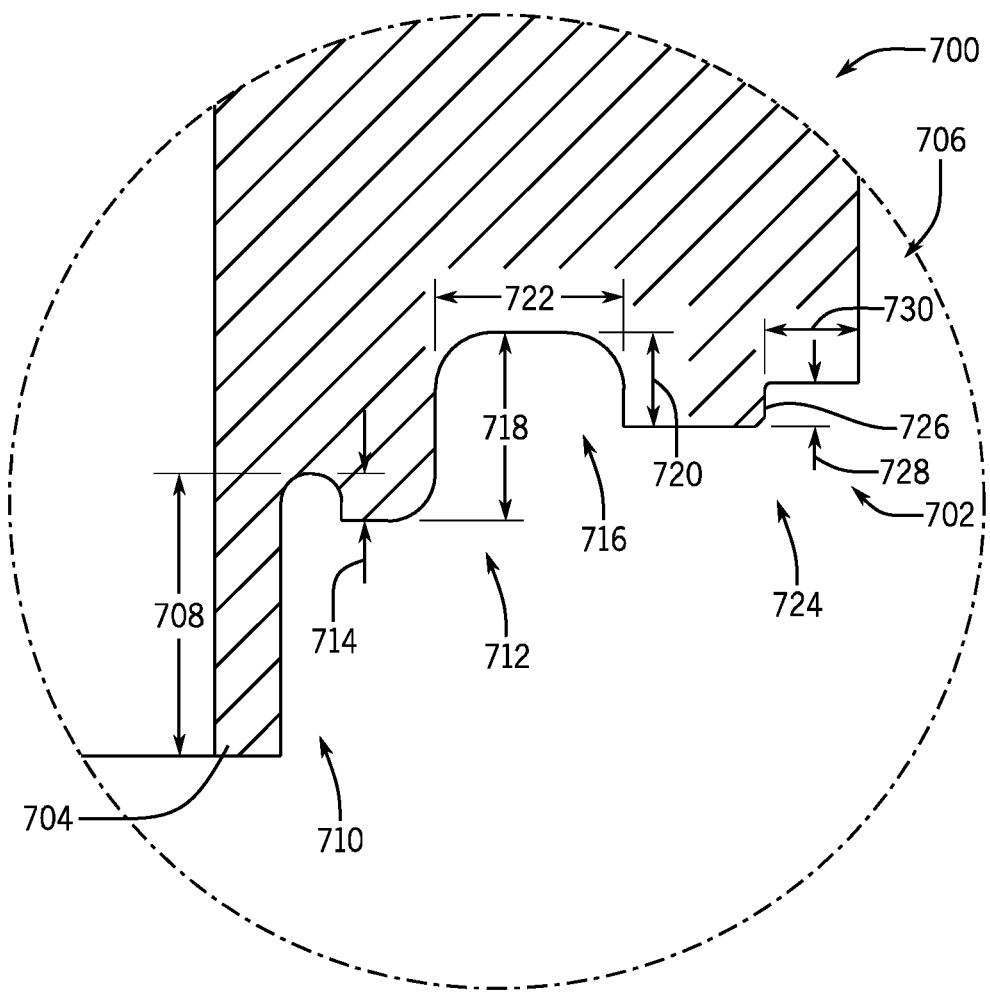
FIG. 7 illustrates a cross-sectional view of an embodiment of a joint face, in accordance with embodiments of the present disclosure.

FIG. 7 is a cross-sectional view of an embodiment of a joint face 700 that may be arranged on an end of a segment used to form a thrust chamber. However, as described above, embodiments of the present disclosure are not limited to aerospace or rocket engines, and may be utilized across a variety of industries. As described with respect to FIG. 6, the joint face 700 includes a profile 702 that, when arranged proximate a mirrored profile, forms an opening to enable installation of a joint insert. It should be appreciated that in various embodiments the joint faces 700 for adjacent segments may not include mirrored profiles, which may provide an indication as to the ordering or arrangement of the segments. The illustrated joint face 700 includes an inner edge 704, which is arranged radially inward from an outer circumference 706 of the segment, for example when the segment is an annular. The inner edge includes a length 708 and forms at least a portion of an annular flow passage 710.

In various embodiments, a lip 712 extends from the joint face 700 to from at least a portion of the annular flow passage 710. The illustrated lip 712 extends a length 714, the length 714 being shorter than the length 708 in the illustrated embodiment. The illustrated lip 712 further forms at least a portion of a cavity 716. The cavity 716 includes a first length 718, a second length 720, and a height 722. As described above, the cavity 716 may be arranged to capture debris or other material generated during the welding procedure to couple the joint insert to the first and second segments. The illustrated joint face 700 further includes a stepped profile 724 that forms a shoulder 726. The illustrated shoulder has a length 728 and a height 730. While the shoulder 726 is illustrated as being straight to squared off, it should be appreciated that various different shapes may be utilized. For example, the shoulder 726 may include a slanted edge, a curved edge, or the like. Moreover, the mating component of the joint insert may also include various different shapes for the extension that mates to the shoulder 726. As will be appreciated, the joint face 700 may be formed during an additive manufacturing process, thereby enabling various different configurations.

Figure 8:
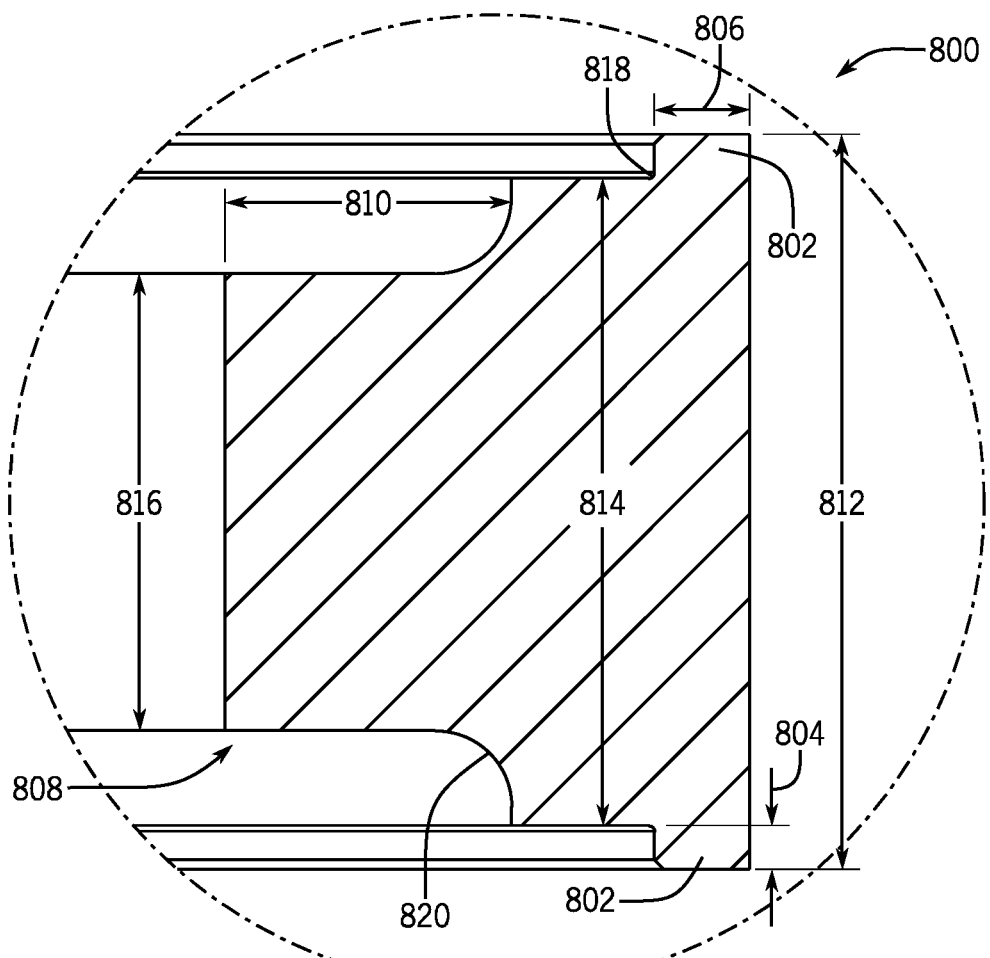
FIG. 8 illustrates a cross-sectional view of an embodiment of a joint insert, in accordance with embodiments of the present disclosure.

FIG. 8 is a cross-sectional view of an embodiment of a joint insert 800. In various embodiments, the joint insert 800 may be utilized to couple different segments together, for example, via the segments that include the joint face 700 illustrated in FIG. 7. In the illustrated embodiment, the joint insert 800 includes an extension 802 having a length 804 and a height 806. Moreover, in various embodiments, the joint insert 800 includes a lower portion 808. The lower portion 808 has a height 810 that may be particularly selected to adjust a cross-sectional area of an annular flow passage, as described above. The joint insert 800 further includes a first length 812, a second length 814, and a third length 816 that forms a stepped outer profile. The first length 812 may correspond to an outer diameter of the joint insert 800 and may be substantially equal to the opening formed between adjacent segments. The second length 814 may be smaller than the first length 812, thereby forming at least a portion of the extension 802 that is seated on the shoulder of the joint face. Additionally, the third length 816 may be substantially equal to a gap or space between lips of the joint face, thereby forming at least a portion of the cavities described above. In various embodiments, the outer profile of the joint insert 800 includes a first transition 818 and a second transition 820. While the illustrated first transition 818 is substantially equal and the illustrated second transition 820 is curved, it should be appreciated that the transitions may include any reasonable shape. The shapes of the transitions 818, 820 may be particularly selected to accommodate operating conditions. In various embodiments, the joint insert 800 is an annular piece. As will be described below, the joint insert 800 may be split to facilitate installation.

Figure 9:
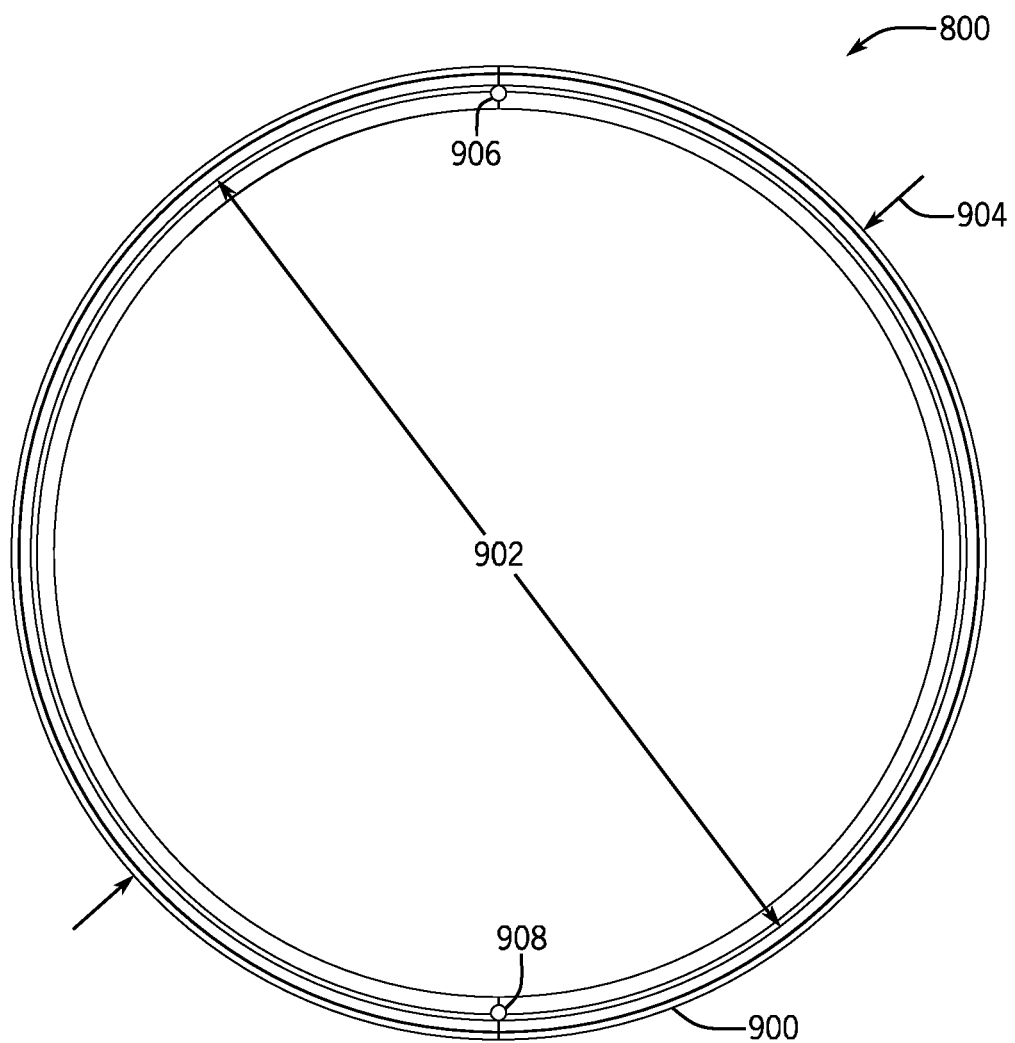
FIG. 9 illustrates a top plan view of an embodiment of a joint insert, in accordance with embodiments of the present disclosure.

FIG. 9 is a top plan view of an embodiment of the joint insert 800. As illustrated, the joint insert 800 includes a circumference 900 and is generally ring shaped having an inner diameter 902 and an outer diameter 904. In various embodiments, the joint insert 800 is arranged on other annular components where the inner diameter 902 is less than an outer diameter of the components. Accordingly, the joint insert 800 may be split to facilitate installation. The illustrated embodiment includes two splitting locations 906, 908. However, it should be appreciated that the joint insert 800 may be split into any number of pieces and have any number of splitting locations. After installation about the components, the joint insert 800 may be reconnected by welding at the splitting locations 906, 908. However, it should be appreciated that other coupling mechanisms may be utilized. For example, the splitting locations 906, 908 may include an eyelet extension to receive a bolt or other fastener.

Figure 10:
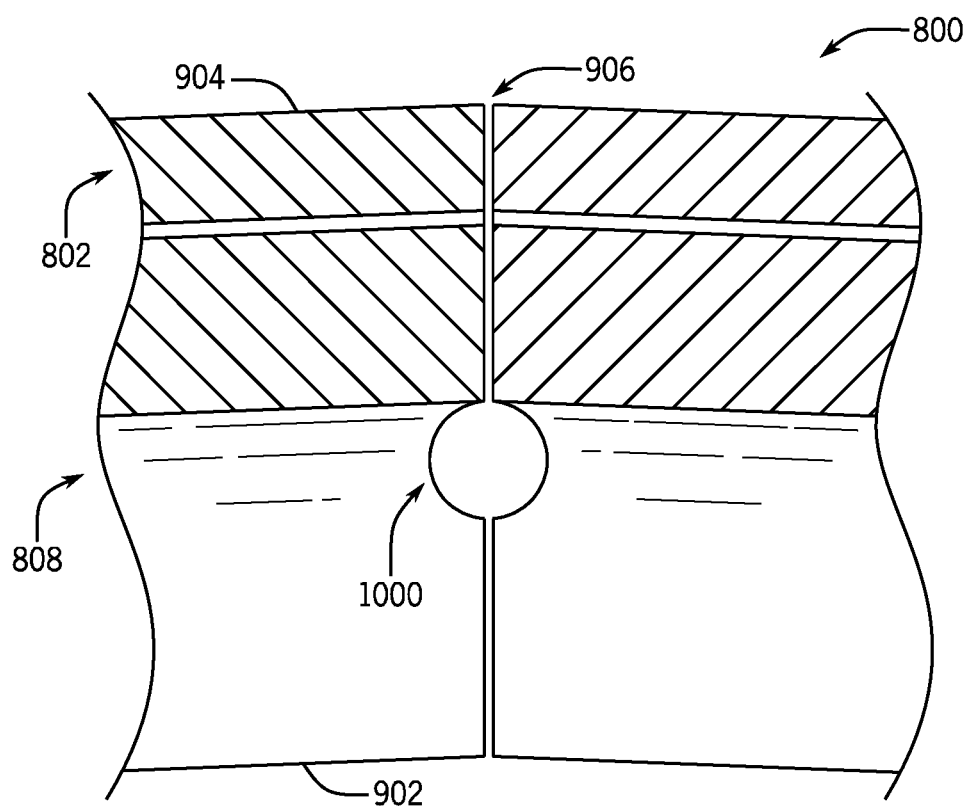
FIG. 10 illustrates a partial side view of an embodiment of a joint insert, in accordance with embodiments of the present disclosure.

FIG. 10 is a partial detailed view of an embodiment of the joint insert 800 at the splitting location 906. As described above, in various embodiments the joint insert 800 may be split to facilitate installation. When the joint insert 800 is installed, the joint insert 800 may be rejoined at the splitting location, for example via a welding process. In the illustrated embodiment, a recess 1000 is formed proximate the splitting location to capture debris or additional materials formed during the welding process. The illustrated recess 1000 is circular, and may be formed by drilling into the joint insert 800, for example, prior to splitting the joint insert. As a result, debris may collect within the recess 1000, blocking the debris from infiltrating other areas. The illustrated recess is formed between the inner diameter 902 and the outer diameter 904. In various embodiments, the recess 1000 may be positioned on the lower portion 808, for example, below the extension 802.

Figure 11:
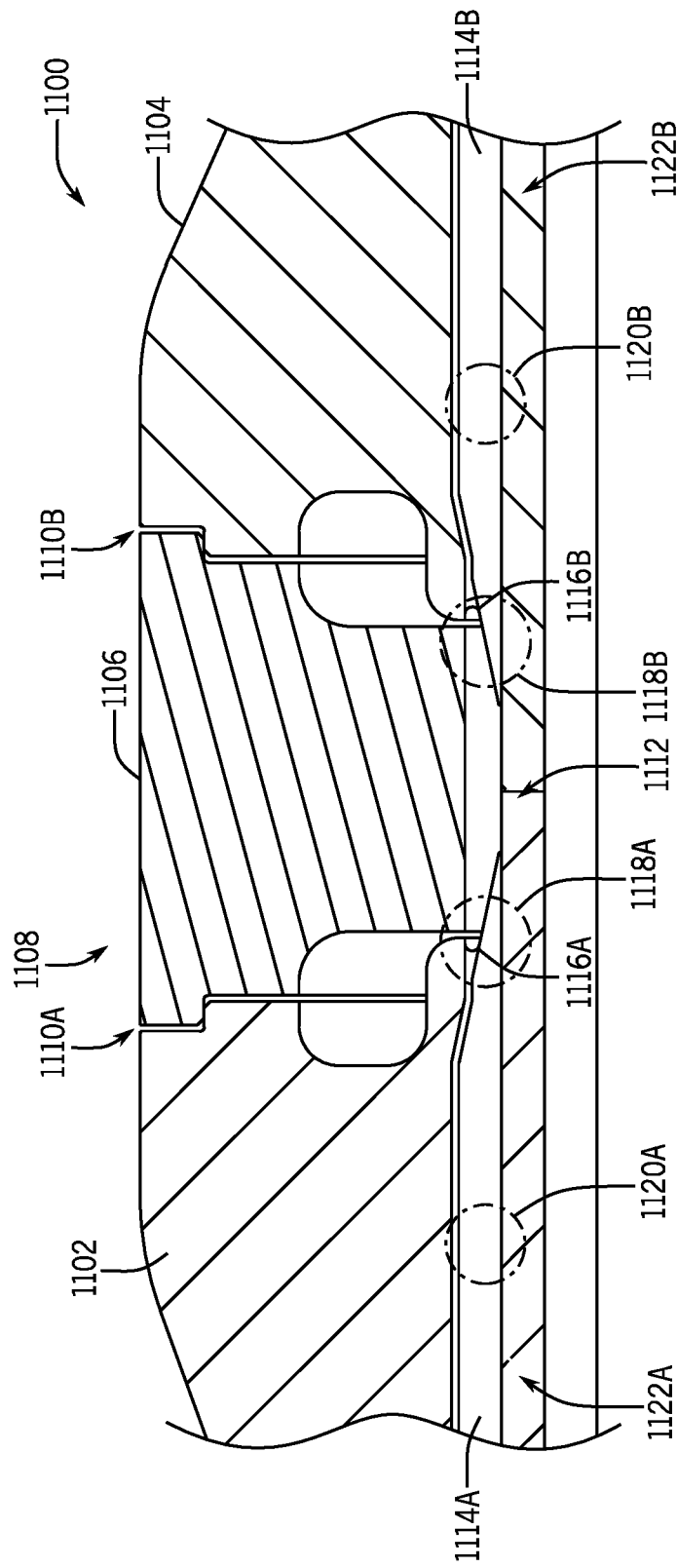
FIG. 11 illustrates a cross-sectional view of an embodiment of a coupling system, in accordance with embodiments of the present disclosure.

FIG. 11 is a cross-sectional view of an embodiment of a coupling system 1100 including a first segment 1102 coupled to a second segment 1104. It should be appreciated that the coupling system 1100 illustrated in FIG. 11 shares certain features with the coupling system 600 of FIG. 6, and as a result, details of certain features will not be repeated. In the illustrated embodiment, a joint insert 1106 extends into an opening 1108 formed between joint faces 1110 of the segment 1102, 1104. The joint insert 1106, in combination with the joint faces 1110A, 1110B form an annular flow passage 1112.

The annular flow passage 1112 in the illustrated embodiment is arranged proximate dividers 1114A, 1114B that include slanted edges 1116A, 1116B. The slanted edges 1116A, 1116B form reduced cross-sectional areas 1118A, 1118B when compared to flow areas 1120A, 1120B of channel 1122A, 1122B formed by the dividers 1114A, 1114B. In various embodiments, the reduced cross-sectional areas 1118A, 1118B facilitate constant (e.g., near constant, substantially constant) flow velocities through the channels 1122A, 1122B. It should be appreciated that, in various embodiments, the slanted edges 1116A, 1116B may also be curved or arcuate or any other shape that facilitates the formation of the reduced cross-sectional areas 1118A, 1118B.

Figure 12:
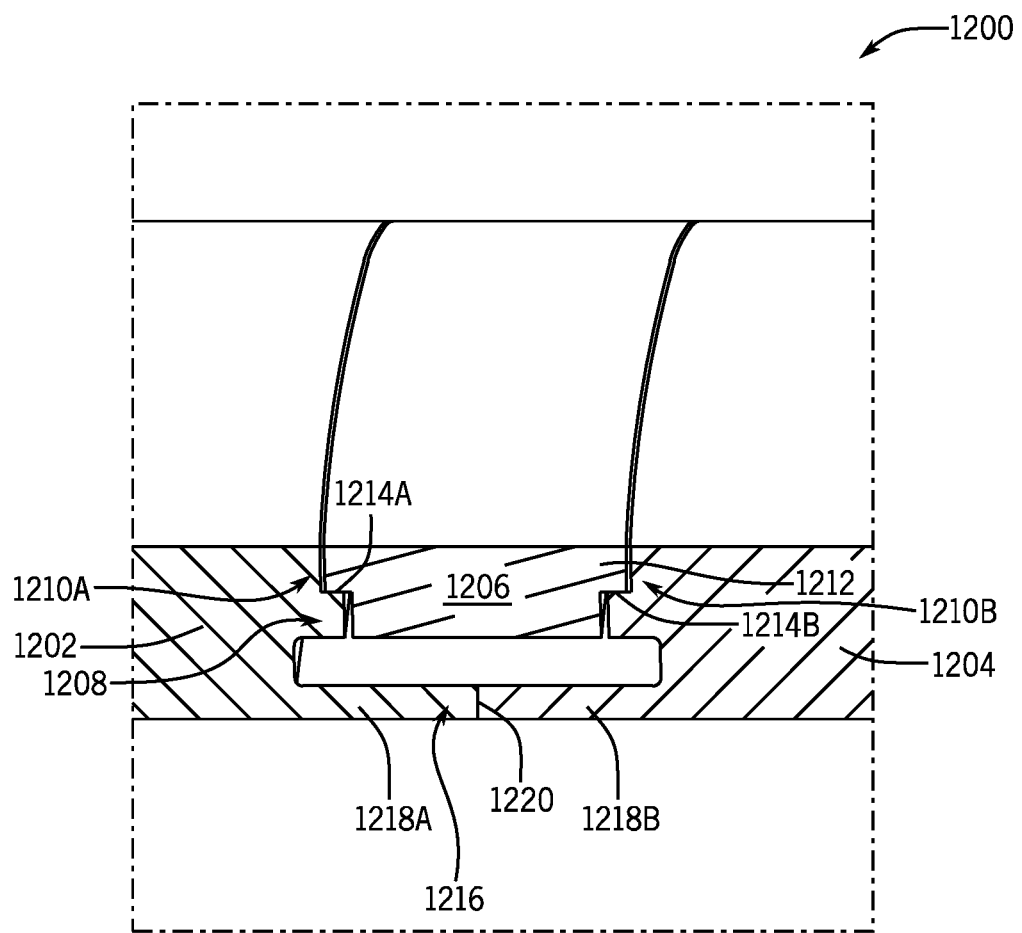
FIG. 12 illustrates a cross-sectional view of an embodiment of a coupling system, in accordance with embodiments of the present disclosure.

FIG. 12 is a cross-sectional perspective view of an embodiment of a coupling system 1200 in which the cavities 624 are removed. As illustrated, a first segment 1202 is arranged proximate a second segment 1204 with a joint insert 1206 arranged within an opening 1208 formed between joint faces 1210A, 1210B (which may individually be referred to as 1210 for clarity when discussing features common to both joint faces 1210A, 1210B) of the segments 1202, 1204. The illustrated joint insert 1206 includes an extension 1212 that is arranged on a shoulder 1214A, 1214B of the joint faces 1210A, 1210B, thereby holding the joint insert 1206 in place. As a result, an annular flow passage 1216 is formed between an inner edge 1218A, 1218B of the segments 1202, 1204 and the joint insert 1206. In operation, a joint 1220 may be formed between the inner edges 1218A, 1218B, for example, using a welding process. Thereafter, the joint insert 1206 may be installed and coupled to the first and second segments 1202, 1204 via a welding process.

Figure 13:
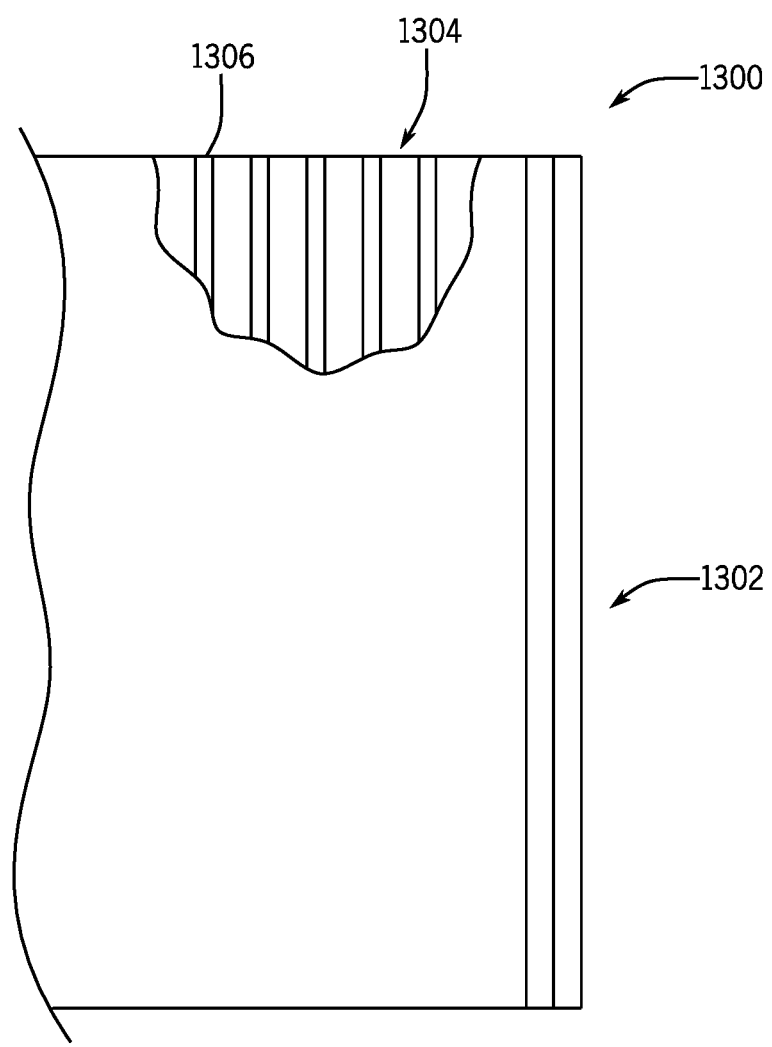
FIG. 13 illustrates a top plan view of an embodiment of a coupling system, in accordance with embodiments of the present disclosure.

As described herein, in various embodiments the thrust chambers may be manufactured in a petal configuration utilizing segments having both longitudinal and circumferential seams. FIG. 13 is a top plan sectional view of an embodiment of a longitudinal segment 1300. The segment 1300 includes a joint face 1302 that is arranged substantially parallel to the illustrated channels 1304 formed by dividers 1306. As will be described below, in various embodiments a joint insert may be arranged between adjacent joint faces of longitudinal segments to couple the adjacent segments together along a longitudinal seam.

Figure 14:
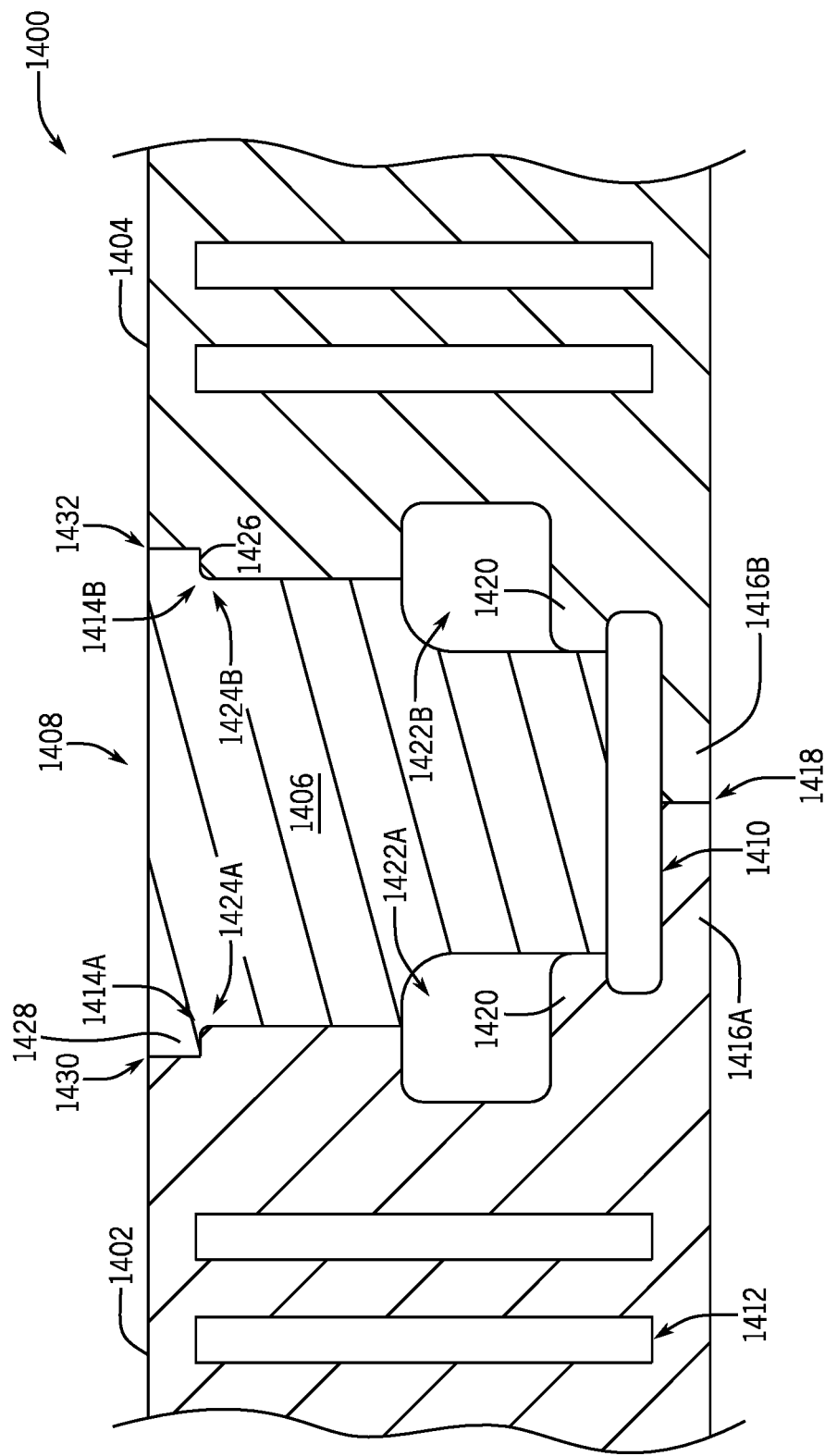
FIG. 14 illustrates a cross-sectional view of an embodiment of a coupling system, in accordance with embodiments of the present disclosure.

FIG. 14 is cross-sectional view of an embodiment of a coupling system 1400 for joining a first segment 1404 to a second segment 1402 along a longitudinal seam. It should be appreciated that the coupling system 1400 may share similarities with other coupling systems described herein, such as the coupling system 600 illustrated in FIG. 6, and as such certain features may not be described with as much detail for clarity and conciseness. The illustrated coupling system 1400 includes a joint insert 1406 (e.g., weld ring) that is arranged within an opening 1408 (e.g., cavity) formed between the first segment 1402 and the second segment 1404, which may be longitudinal segments are described in FIG. 2. In various embodiments, the opening 1408 is a longitudinal opening, for example, where the segments 1402, 1404 are annular components that are jointed along a vertical seam. The joint insert 1406 couples the first segment 1402 to the second segment 1404 while maintaining a longitudinal flow passage 1410 to enable the working fluid to flow substantially parallel to the channels 1412, thereby maintaining the cooling effect of the working fluid. It should be appreciated that the size of the longitudinal flow passage 1410 is for illustrate purposes only, and in various embodiments, the longitudinal flow passage 1410 may be substantially the same size as the channels 1412.

In various embodiments, each segment 1402, 1404 includes a respective joint face 1414A, 1414B (which may individually be referred to as 1414 for clarity when discussing features common to both joint faces 1414A, 1414B) having a profile including one or more features to facilitate coupling between the segment 1402, 1404. An inner edge 1416A extends outwardly from the joint face 1414A (e.g., radially, relative to a flow of the working fluid) in a similar manner as the inner edge 1416B and the joint face 1414B. The respective inner edges 1416A, 1416B mate to form an inner joint 1418 (e.g., to form the inner wall described above). It should be appreciated that "inner" in this instance refers to a radially inward joint relative to an outer circumference of the thrust chamber, as described above. The illustrated inner joint 1418 is formed by square inner edges 1416A, 1416B. However, as noted above, other shapes may be used and inner edges 1416A, 1416B may not be the same shape. In operation, the inner joint 1418 may couple the first segment 1402 to the second segment 1404 via a weld, as noted above.

A lip 1420A is formed on the joint face 1414A, with a lip 1420B formed on the joint face 1414B. As illustrated, the lips 1420A, 1420B does not extend as laterally far from the joint faces 1414A, 1414B as the inner edges 1416A, 1416B, respectively. The illustrated lips 1420A, 1420B, in part with the inner edges 1416A, 1416B, form at least a portion of the longitudinal flow passage 1410 to facilitate passage of the working fluid for cooling. It should be appreciated that, in various embodiments, several longitudinal segments may be joined together, and in embodiments, the longitudinal seams may not be aligned. As a result, the longitudinal flow passages 1410 may also align with channels 1412 of other segments. Moreover, in various embodiments, the annular flow passage described above may be utilized at the ends of the longitudinal segments to facilitate flow of the working fluid.

In various embodiments, a cavity 1422A, 1422B (which may individually be referred to as 1422 for clarity when discussing features common to both cavities 1422A, 1422B) is formed along the joint face 1414A, 1414B. The cavities 1422A, 1422B are formed at least partially by the respective lips 1420A, 1420B and also by a stepped profile, such as the profile described above. Each respective cavity 1422A, 1422B extends laterally into the body of the respective segments 1402, 1404. As a result, a void space is formed to collect debris during welding operations (or other coupling operations) that couple the joint insert 1406 to the segments 1402, 1404. As noted above, various dimensions of the cavities 1422A, 1422B may be adjusted for particular purposes. For example, a top portion of the cavities 1422A, 1422B may extend beyond a weld seam to reduce the likelihood of cracking.

In the embodiment illustrated in FIG. 14, a respective stepped profile 1424A, 1424B is arranged radially outward from the respective cavity 1422A, 1422B. The stepped profile 1424A, 1424B, includes a shoulder 1426 for receiving and supporting the joint insert 1406, which is positioned within the opening 1408 such that an extension 1428 of the joint insert 1406 contacts the shoulder 1426, thereby blocking further inward radial movement of the joint insert 1406. As illustrated, the extension 1428 forms at least a portion of the joint insert profile.

In various embodiments, the first segment 1402 is coupled to the second segment 1404 via one or more welding operations and the joint insert 1406. For example, the first segment 1402 is arranged proximate the second segment 1404 such that the inner edges 1416A, 1416B are positioned proximate one another. The inner joint 1418 may be formed, for example via electron beam welding, and subsequently inspected and/or cleaned (e.g., ground, finished, etc.) Thereafter, the joint insert 1406 may be positioned within the opening 1408. The extension 1428 may contact the shoulder 1426, thereby blocking further movement of the joint insert 1406 and also providing an indication that the joint insert 1406 is positioned within the opening 1408. Next, a joint 1430 may be formed at the junction between the joint insert 1406 and the first segment 1402. Debris that may form during the welding operation may be captured by the cavities 1422A, 1422B, and as a result, the "blind" welding operation may be performed without inspecting the reverse end to determine whether weld metal, shavings, or the like have formed. Additionally, a second joint 1432 may be formed at the junction between the joint insert 1406 and the second segment 1404. As a result, the first segment 1402 and the second segment 1404 may be joined together, while enabling flow along the channels, thereby facilitating construction of the thrust chamber using smaller segments that may be formed using additive manufacturing techniques.

Figure 15C:
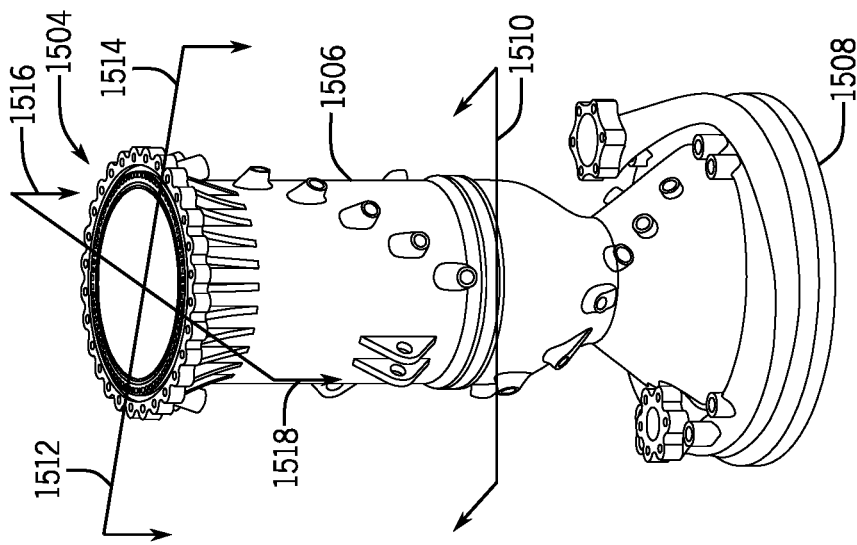
Figure 15B:
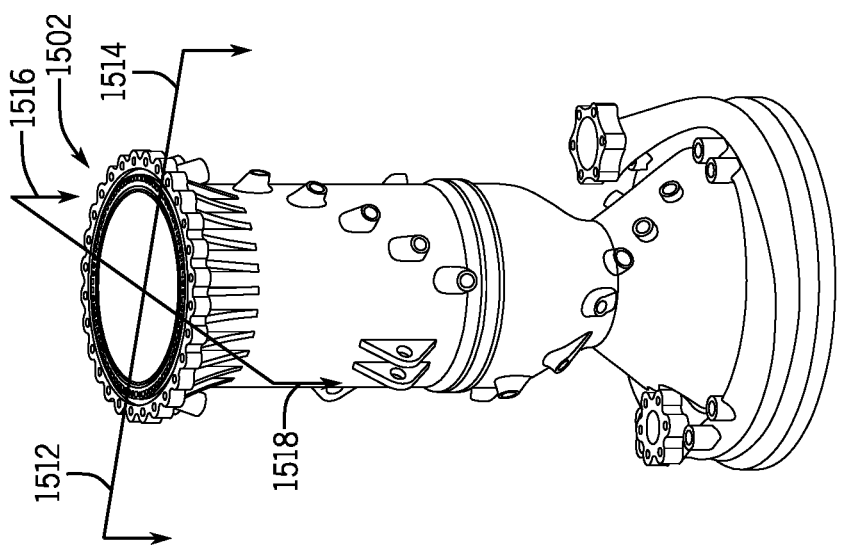
Figure 15A:
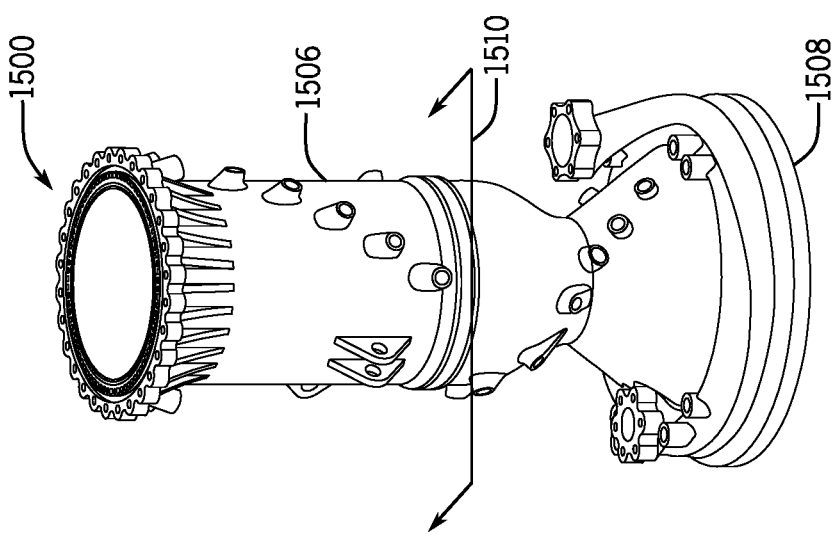

FIGS. 15A-C are isometric views of thrust chambers 1500, 1502, 1504 manufactured utilizing the systems and methods described herein in a variety of configurations. For example, the thrust chamber 1500 includes a first component 1506 and a second component 1508 coupled together via a joint 1510. The illustrated joint is a circumferential joint, and may be formed utilizing the coupling system 600 illustrated in FIG. 6, among others.

FIG. 15B illustrates the thrust chamber 1502 formed via in a petal configuration that includes four joints 1512, 1514, 1516, 1518. The illustrated joints are longitudinal joints and may be formed utilizing the coupling system 1400 illustrated in FIG. 14, among others. As a result, four different joints may be used to form one or more portions of the first component 1506 and/or the second component 1508.

FIG. 15C illustrates the thrust chamber 1504 formed via a combination of the circumferential joint and the petal configuration. That is, the thrust chamber 1504 includes both longitudinal joints 1512, 1514, 1516, 1518 and a circumferential joint 1510. Accordingly, various different joint configurations may be utilized together to form a variety of different components. Advantageously the inclusion of different joint configurations enables smaller component manufacturing, which may be accomplished using additive manufacturing processes, without the drawbacks and problems described herein.

FIGS. 15D-15H are isometric views of an embodiment of the thrust chamber 1500, 1502, 1504 formed utilizing embodiments of the present disclosure. In the illustrated embodiment, the thrust chamber 1500, 1502, 1504 is formed by a combustion chamber 1520, which may be printed as described above, a nozzle 1522, which may also be printed, and a plurality of joint inserts 1524, 1526, 1528 (e.g., weld rings or split rings). As described in detail above, in various embodiments the components may be formed from an additive manufacturing process, such as a three-dimensional printing process, and various components may be machined or otherwise prepared, for assembly into the illustrated thrust chamber 1500, 1502, 1504. In certain embodiments, the thrust chamber 1500, 1502, 1504 may include one or more joints, such as the joints (e.g., joint 506, 1510, 1512, etc.) described above which may enable circumferential and/or longitudinal coupling between components.

Figure 15F:
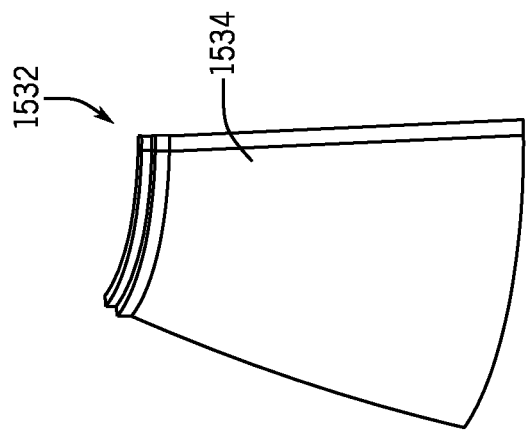
Figure 15E:
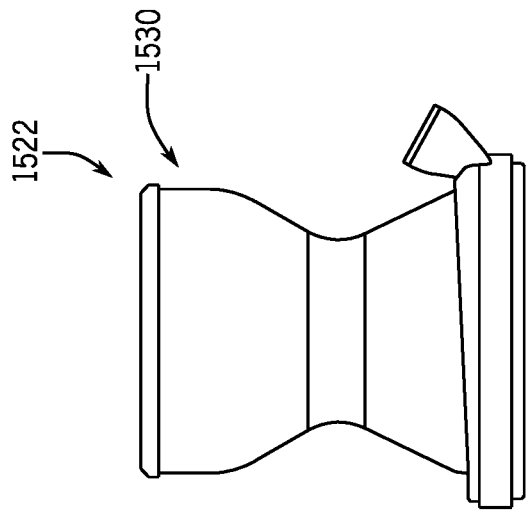
Figure 15D:
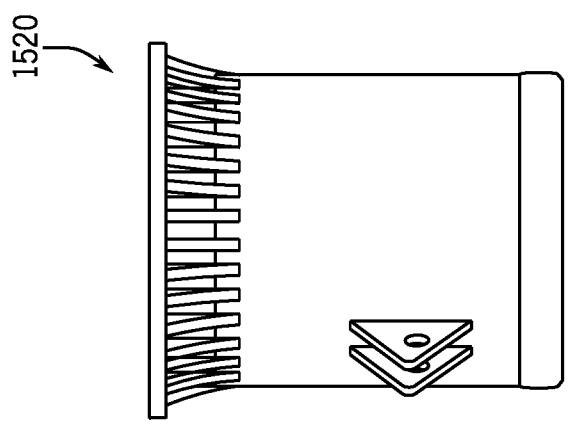

The illustrated embodiments include the combustion chamber 1520 illustrated in FIG. 15D. It should be appreciated that the combustion chamber 1520 may be printed as an entire chamber or in sections connected along joints, such as the joints 1512, 1514, 1516, 1518. FIG. 15E illustrates a first portion 1530 of the nozzle 1522. As noted above with respect to the combustion chamber 1520, the first portion 1530 may be a single piece or connected along one or more circumferential or longitudinal joints. FIGS. 15F and 15G illustrate a second portion 1532 of the nozzle 1522. FIG. 15F includes a nozzle quarter sections 1534. In various embodiments, there may be four nozzle quarter sections 1534A, 1534B, 1534C, 1534D joined along longitudinal joints, as illustrated in FIG. 15G. Accordingly, the nozzle 1522 may be constructed using the first and second nozzle portions 1530, 1532.

The embodiment illustrated in FIG. 15H includes the thrust chamber 1500, 1502, 1504 constructed using the combustion chamber 1520, the nozzle 1522, and the joint inserts 1524, 1526, 1528. In the illustrated embodiment, the joint inserts 1524, 1526, 1528 enable circumferential joints between various sections of the thrust chamber 1500, 1502, 1504. Accordingly, pieces of the thrust chamber 1500, 1502, 1504 may be individually fabricated, machined, and joined together, rather than attempting to compile the entirety of the thrust chamber 1500, 1502, 1504 at once.

Figure 16:
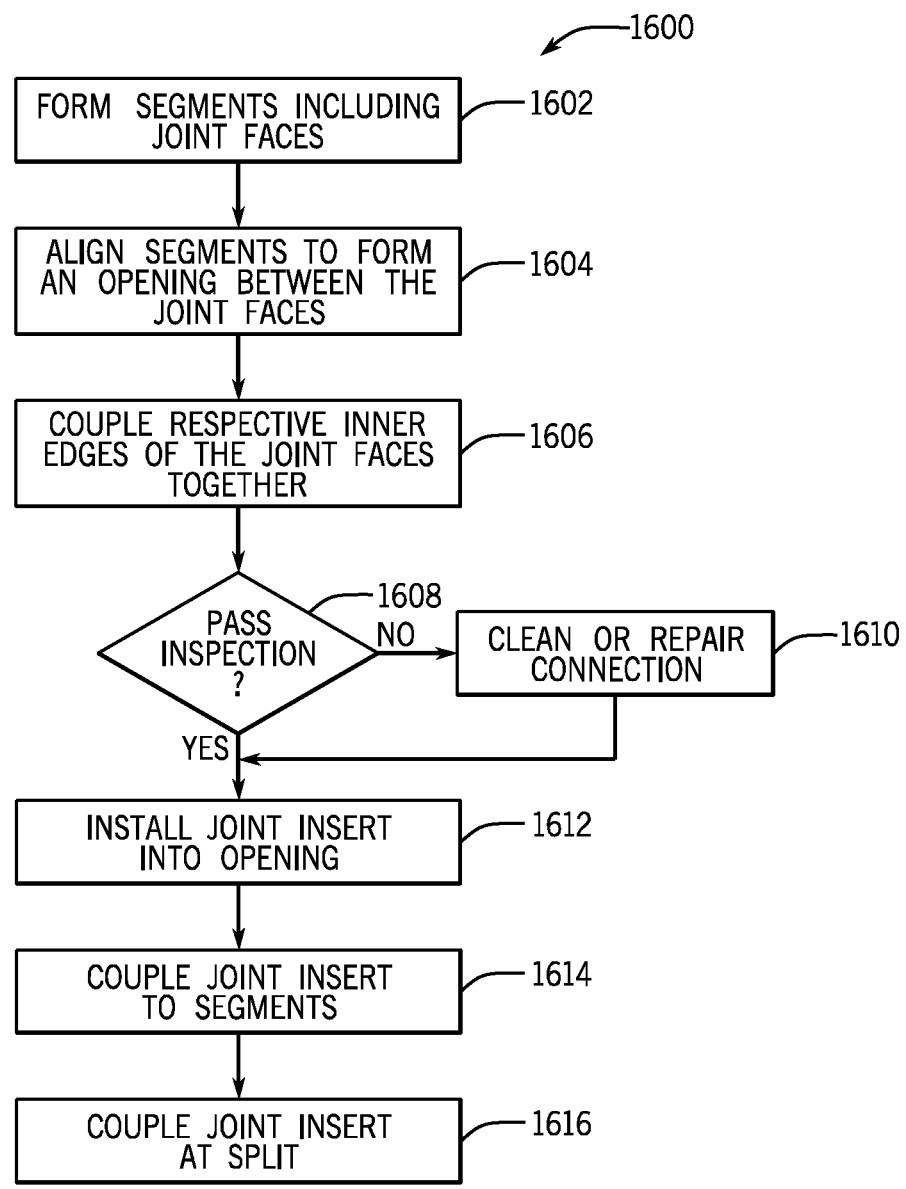
FIG. 16 illustrates a flow chart of an embodiment of a method for coupling segments together, in accordance with embodiments of the present disclosure.

FIG. 16 is a flow chart representing a method 1600 for coupling two segments together. It should be understood that, for any process discussed herein, there can be additional, fewer, or alternative steps performed in similar or alternative orders, or in parallel, within the scope of the various embodiments. The method begins by forming segments 1602 that may be used to create a three-dimensional form, such as a thrust chamber. In various embodiments, the segments may be formed via an additive manufacturing process, such as three-dimensional printing, and may be of a variety of materials, such as metals, plastics, composites, combinations thereof, and the like. The segments may include joint faces to facilitate coupling of adjacent segments to one another. In various embodiments, the joint faces may be mirror images of one another. However, in other embodiments, the joint faces may not be mirror images, thereby providing an indication as to the order or arrangement of the segments.

In various embodiments, the method further includes aligning segments adjacent to one another to form a cavity 1604. For example, the cavity may be formed due to a particular profile of the joint faces of the segments. Furthermore, adjacent alignment may include positioning the segments close enough to connect them, for example, via a welding process. In various embodiments, welding processes may include a gap space between components, and as a result, adjacent arrangements may not necessarily include having the segments touching. Furthermore, in various embodiments, the segments may include internal channels to facilitate a fluid flow for regenerative cooling. As such, the alignment of the segments may include aligning both the joint faces and the internal channels.

In various embodiments, the inner edges of the joint faces are coupled together 1606. For example, the inner edges may be welded together or otherwise connected. The connection may be made by extending a tool, such as a welding rod or the like, through the opening formed between the joint faces. After the connection is made, the connection is inspected 1608. For example, if the connection is a weld it may be inspected for quality, as well as for cleanliness of the surrounding surfaces. If the inspection fails, the connection may be cleaned 1610, or in certain cases repaired/redone. As noted above, the space of the cavity provides sufficient area to evaluate the weld and perform additional processes.

The method further includes installing a joint insert into the cavity between the joint faces 1612. For example, the joint insert may be lowered into the opening. In various embodiments, a shoulder to the like may block movement of the joint insert beyond a predetermined location, for example, beyond a location that would impede the annular flow passage. The joint insert is coupled to the adjacent segments 1614. For example, a coupling process such as welding may be utilized to connect the joint insert to the segments. Additionally, in various embodiments, a split in the joint insert may also be coupled 1616. In various embodiments, the joint insert is an annular ring having an inner diameter that is smaller than an outer diameter of the segments. As a result, the joint insert may be split and then reattached before or after the joint insert is coupled to the segments. In this manner, multiple segments may be joined together to from various larger components.

Figure 17:
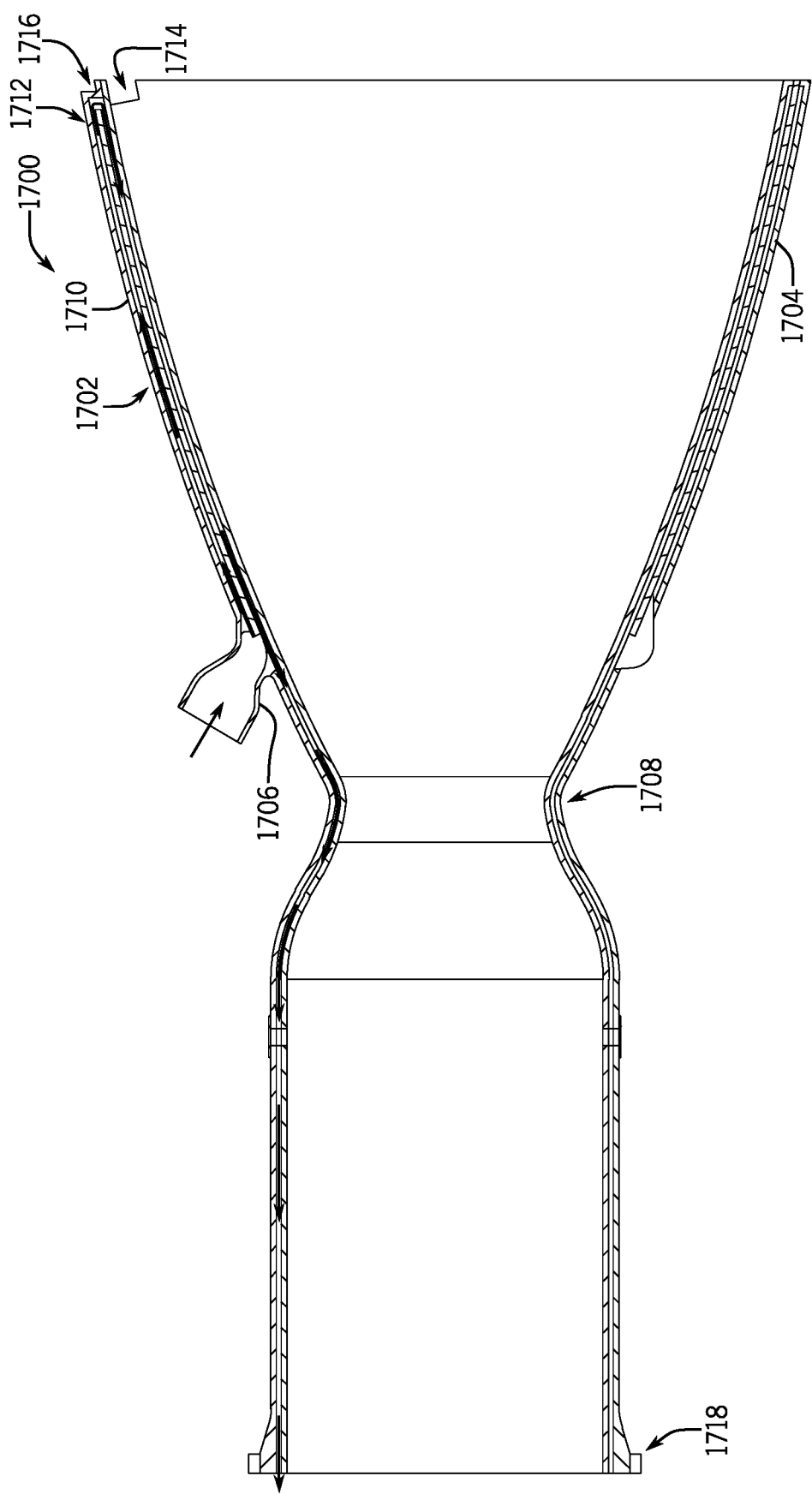
FIG. 17 illustrates a cross-sectional view of an embodiment of a thrust chamber including a bi-directional flow path, in accordance with embodiments of the present disclosure.

FIG. 17 is a cross-sectional side view of an embodiment of a thrust chamber 1700 including a bi-directional flow path 1702 formed within walls 1704 of at least a portion of the thrust chamber 1700. In the illustrated embodiment, fuel is injected through a fuel inlet 1706, which is arranged proximate a midpoint 1708 of the thrust chamber 1700. It should be appreciated that the fuel inlet 1706 location proximate the midpoint 1708 is for illustrative purposes only, and that in other embodiments, the fuel inlet 1706 may be positioned at different positions along the thrust chamber 1700 and/or at other locations entirely. The fuel enters and travels along a flow path 1710 that includes an outer flow path 1712 and an inner flow path 1714. The illustrated outer flow path 1712 is radially outward from the inner flow path 1714. At described above, in various embodiments, flow channels may be arranged to segment or separate the flow within the outer flow path 1712 and the inner flow path 1714. The outer flow path 1712 of FIG. 17 extends to a return manifold 1716, which redirects the fluid in the outer flow path 1712 into the inner flow path 1714. For example, the return manifold 1716 may include a bend or an open chamber where pressure will drive the fluid into the flow channels of the inner flow path 1714.

The illustrated embodiment includes at least a portion of the flow path 1710 including bi-directional flow where the outer flow path 1712 is arranged radially outward from the inner flow path 1714 such at fluid in the outer flow path 1712 flows in a direction substantially opposite the fluid in the inner flow path 1714. This may be referred to as countercurrent flow, which may, under certain conditions, facilitate improved heat transfer between the fluid paths. Additionally, the counter-flow heat exchange provides benefits such as minimizing thermal stresses due to uniform or substantially uniform temperature differences and a more uniform rate of heat transfer along the chamber.

The inner flow path 1714 continues past the outer flow path 1712 and the fuel inlet 1706, in the illustrated embodiment, for injection at an injector interface 1718. Accordingly, the temperature of the fuel may be increased due to the heat transfer between the nozzle and the fuel, and additionally, the walls 1704 may be cooled by the flow of the fluid.

Figure 18:
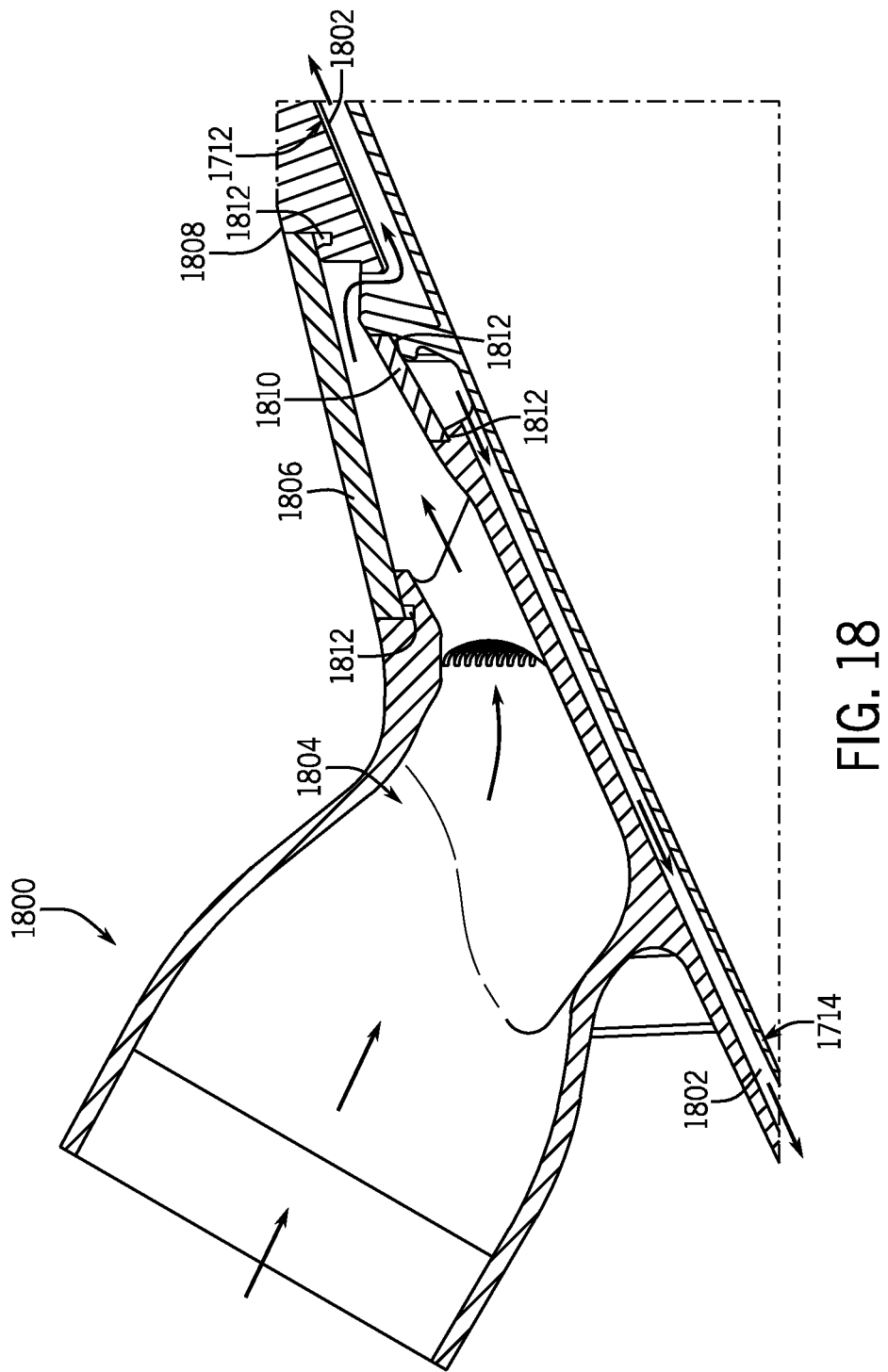
FIG. 18 illustrates a cross-sectional view of an embodiment of an inlet including a bi-directional flow path, in accordance with embodiments of the present disclosure.

FIG. 18 is a cross-sectional side view of an embodiment of a fuel inlet 1800, which may be similar to the fuel inlet 1706 of FIG. 17. In the illustrated embodiment, the bi-directional flow path 1702 is illustrated within the walls 1704 that enables flow in substantially opposite directions. The fuel inlet 1800 includes the outer flow path 1712, which may be separated by a plurality of flow channels 1802, as described above, as well as the inner flow path 1714 that also includes the flow channels 1802.

Regarding the outer flow path 1712, the fuel (e.g., fluid) enters at an opening 1804 and flows through one of the channels 1802. A first joint insert 1806 is positioned at a radially outward location along an outer wall 1808. Furthermore, the outer flow path 1712 is bound, at least partially, by a second joint insert 1810, which is arranged radially inward from the first joint inset 1806 to separate the inner flow path 1714 from the outer flow path 1712. As described in detail above, the first and second joint inserts 1806, 1810 may include similar functionality to the coupling system, such as coupling system 600, that enables welding or other joining methods over one or more cavities (e.g., cavities 624A, 624B) to reduce the likelihood of blow through. For example, the cavities 1812 illustrated in FIG. 18 may be utilized to facilitate coupling of the first joint insert 1806 and the second joint insert 1810, as described above. Thereafter, the flow may be directed along the respective flow paths.

It should be appreciated that, in other embodiments, there may not be an inner flow path and an outer flow path, but instead, different flow paths will be arranged within the flow channels at the same radial distance. For example, alternating channels may include flow in different directions. As a result, the thickness of the walls may not be increased (e.g., due to the additional of a radially outward flow path). The return manifold, described above, may include various different routing mechanisms to redirect the flow, such as layered flow passages and the like to maintain separation between flow in a first direction and an opposite second direction.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for joining adjacent segments, comprising:
a first segment having a first joint face, the first joint face including a first profile with a first feature extending from the first joint face;
a second segment having a second joint face, the second joint face including a second profile with a second feature extending from the second joint face; and
a joint insert having an insert profile mating with at least a portion of the first profile and at least a portion of the second profile, the joint insert arranged within an opening formed between the first segment and the second segment, wherein the joint insert is annular and includes at least two splitting locations, the splitting locations separating the joint insert into at least two joint insert pieces, and the joint insert comprises a first recess at the first splitting location, and a second recess at the second splitting location.

2. The system of claim 1, wherein the first feature is a first inner edge and the second feature is a second inner edge, further comprising:
a flow passage formed between the first inner edge, the second inner edge, and the joint insert, the flow passage having a cross-sectional flow area to direct a fluid from first channels formed in the first segment to second channels formed in the second segment.

3. The system of claim 2, wherein the first channels and the second channels are formed by dividers extending between an inner wall of the first segment and an outer wall of the second segment.

4. The system of claim 1, further comprising:
a first chamber forming at least a portion of the first profile, the first chamber being at least partially aligned with a first mating interface between the joint insert and the first segment; and
a second chamber forming at least a portion of the second profile, the second chamber being at least partially aligned with a second mating interface between the joint insert and the second segment.

5. The system of claim 1, wherein the first segment is secured to the joint insert via a welding process and the second segment is secured to the joint insert via the welding process.

6. The system of claim 1, further comprising:
a first shoulder forming at least a portion of the first profile;
a second shoulder forming at least a portion of the second profile;
a first extension forming at least a portion of the insert profile and mating with the first shoulder; and
a second extension forming at least a portion of the insert profile and mating with the second shoulder, wherein the first shoulder and the second shoulder restrict movement of the joint insert in at least two directions.

7. The system of claim 1, where the first segment and the second segment are annular.

8. The system of claim 7, wherein the first segment and the second segment form at least a portion of a rocket engine.

9. A method for coupling adjacent segments together, comprising:
positioning a first segment proximate a second segment to form an opening therebetween;
coupling a first inner wall of the first segment to a second inner wall of the second segment;
positioning a joint insert within the opening, after coupling the first inner wall to the second inner wall, to align the joint insert with a first outer wall of the first segment and a second outer wall of the second segment;
forming a first cavity proximate the first segment at least partially defined by the joint insert, the first cavity being aligned with a first mating interface between the first segment and the joint insert;
forming a second cavity proximate the second segment at least partially defined by the joint insert, the second cavity being aligned with a second mating interface between the second segment and the joint insert; and
securing the joint insert directly to the first outer wall and directly to the second outer wall, the joint insert forming a space between a bottom of the joint insert and the first inner wall and the second inner wall.

10. The method of claim 9, wherein at least one of an electron beam welding process, a tungsten inert gas welding process, a metal inert gas welding process, an arc welding process, a shielded metal arc welding process, a flux-cored arc welding process, or a combination thereof is used to couple the first inner wall to the second inner wall.

11. The method of claim 9, wherein positioning the first segment proximate the second segment further comprises aligning a first flow channel of the first segment with a second flow channel of the second segment.

12. The method of claim 11, wherein the space forms a flow passage fluidly coupling the first flow channel to the second flow channel.

13. The method of claim 9, wherein arranging the joint insert within the opening further comprises:
landing an extension on the joint insert on a first shoulder of the first segment and a second shoulder of the second segment.

14. A system for joining adjacent annular segments, comprising:
a first segment having a first joint face, the first joint face including a first profile with a first feature extending from the first joint face;
a second segment having a second joint face, the second joint face including a second profile with a second feature extending from the second joint face;
a joint insert having an insert profile mating with at least a portion of the first profile and at least a portion of the second profile, the joint insert arranged within an opening formed between the first segment and the second segment;
a first chamber forming at least a portion of the first profile, the first chamber being at least partially aligned with a first mating interface between the joint insert and the first segment;
a second chamber forming at least a portion of the second profile, the second chamber being at least partially aligned with a second mating interface between the joint insert and the second segment; and
an annular flow passage at least partially defined by the first segment, the second segment, and the joint insert, wherein a first flow path extends between the first chamber and the annular flow passage and a second flow path extends between the second chamber and the annular flow passage.

15. The system for joining adjacent annular segments of claim 14, wherein a first flow passage cross-sectional flow area is defined, at least in part, by a slanted edge of a divider extending into the annular flow passage.

16. The system for joining adjacent annular segments of claim 14, wherein the first segment is secured to the joint insert via a welding process and the second segment is secured to the joint insert via the welding process.

17. The system for joining adjacent annular segments of claim 14, further comprising:
a first shoulder forming at least a portion of the first profile;
a second shoulder forming at least a portion of the second profile;
a first extension forming at least a portion of the insert profile and mating with the first shoulder; and
a second extension forming at least a portion of the insert profile and mating with the second shoulder.

\* \* \* \* \*